US006395070B1

(12) United States Patent
Bhadha et al.

(10) Patent No.: US 6,395,070 B1
(45) Date of Patent: May 28, 2002

(54) METHODS FOR REMOVAL OF IMPURITY METALS FROM GASES USING LOW METAL ZEOLITES

(75) Inventors: Paul M. Bhadha, Cooper City, FL (US); Tadaharu Watanabe; Dan Fraenkel, both of Boulder, CO (US)

(73) Assignee: Matheson Tri-Gas, Inc., Parsippany, NJ (US)

( * ) Notice: Subject to any disclaimer, the term of this patent is extended or adjusted under 35 U.S.C. 154(b) by 0 days.

(21) Appl. No.: 09/543,246

(22) Filed: Apr. 5, 2000

Related U.S. Application Data

(63) Continuation-in-part of application No. 09/166,987, filed on Oct. 6, 1998, now Pat. No. 6,110,258.

(51) Int. Cl.$^7$ .......................... B01D 53/04; B01D 53/26

(52) U.S. Cl. ........................ 95/117; 95/126; 95/132; 95/902; 502/78; 502/79

(58) Field of Search ........................... 95/117, 121, 126, 95/132, 135, 902; 96/108; 502/77–79, 81, 83, 85

(56) References Cited

U.S. PATENT DOCUMENTS

| | | | |
|---|---|---|---|
| 43,748 A | | 8/1864 | Beanes |
| 1,831,673 A | | 11/1931 | Liebknecht |
| 3,492,088 A | | 1/1970 | Hildebrand |
| 4,019,879 A | * | 4/1977 | Rabo et al. ............... 95/902 X |
| 4,377,502 A | * | 3/1983 | Klotz ........................ 502/78 X |
| 4,529,416 A | * | 7/1985 | Sircar et al. ............. 95/902 X |
| 4,544,378 A | * | 10/1985 | Coe et al. ................ 95/902 X |
| 4,557,921 A | * | 12/1985 | Kirsch et al. ............ 95/132 X |
| 4,564,509 A | * | 1/1986 | Shealy et al. ............ 423/210.5 |
| 4,569,833 A | | 2/1986 | Gortsema et al. ....... 423/328 X |
| 4,663,052 A | * | 5/1987 | Sherman et al. ............ 210/679 |
| 4,762,537 A | * | 8/1988 | Fleming et al. ................ 95/132 |
| 4,844,719 A | * | 7/1989 | Toyomoto et al. ............. 55/16 |
| 4,861,571 A | * | 8/1989 | Harada et al. ............ 502/78 X |
| 4,925,646 A | * | 5/1990 | Tom et al. .................. 423/488 |
| 5,070,052 A | * | 12/1991 | Brownscombe et al. .. 502/78 X |
| 5,417,742 A | * | 5/1995 | Tamhankar et al. ....... 95/902 X |
| 5,417,950 A | * | 5/1995 | Sheu et al. ............... 95/902 X |
| 5,470,557 A | * | 11/1995 | Garney ..................... 95/117 X |
| 5,518,528 A | * | 5/1996 | Tom et al. ................ 95/902 X |
| 5,536,301 A | * | 7/1996 | Lansbarkis et al. ........... 95/117 |
| 5,616,170 A | * | 4/1997 | Ojo et al. ................ 95/902 X |
| 5,670,125 A | * | 9/1997 | Sheu et al. ............... 95/902 X |
| 5,910,292 A | * | 6/1999 | Alvarez, Jr. et al. ...... 95/117 X |
| 5,958,356 A | * | 9/1999 | Dong et al. .............. 95/117 X |

FOREIGN PATENT DOCUMENTS

| | | | |
|---|---|---|---|
| JP | 52-065194 | * | 5/1977 |
| JP | 52-089602 | * | 7/1977 |
| JP | 61-054235 | * | 3/1986 |

OTHER PUBLICATIONS

Barrer, R. M. et al., 1970, "The Sorption of Ammonium Chorlide Vapor in Zeolites: Part 1 Hydrogen Chorlide and Ammonia", J. Chem. Soc. (A) pp. 765–782.*
Collins, J.J., 1963, "A Report on Acid–Resistant Molecular Sieve Types AW–300 and AW–500", Molecular Sieves Product Data Sheet, Union Carbide International Co., 270 Park Avenue, New York, N.Y. 10017.*
Davis, M.E., 1991, "Zeolites and Molecular Sieves: Not Just Ordinary Catalysts", Ind. Eng. Chem. Res. 30(8): 1675–1683.*
Hales, G.E., 1971, "Drying Reactive Fluids with Molecular Sieves", Chemical Eng. Progress 67(11):49–53.*
Hardwick et al., 1989, "Corrosion of Type 316 Stainless Steel in Anhydrous Hydrogen Chloride", Abstract No. 50, pp. 78–79, Presented at the Spring 1989 Meeting of the Electrochemical Society, Los Angeles, CA, May 1989.*
Kuhl G.H., 1977, "The Acidity of Mordenite", Molecular Sieves–II, James R. Katzer, Ed., ACS Symposium Series 40, Chapter 9, pp. 96–107.*
Pivonka, 1991, "The Infrared Spectroscopic Determination of Moisture in HCL for the Characterization of HCL Gas Drying Resin Performance", Applied Spectroscopy 45(4):597–603.*
Torres et al., 1998, "High Pressure POV Purification of Corrosive Gases: Effect on Gas Distribution Components", from Semicon West 98 Programs and Events, Jul. 9–21, San Francisco and San Jose, California.*
Weber, D.K., 1990, "Preventing Corrosion in Hydrogen Chloride Gas Handling Systems", Microcontamination 8(7): 35–37.*
Zeolon Acid Resistant Molecular Sieves, 1970, Norton Chemical Process Products Division, pp. 1–11.*
L. E. Fosdick and P. M. Bhadha, "Analysis of Hydrogen Choride Gas After Treatment with Dryer Resin for Trace Elemental Contaminants by ICP–AES with Ultrasonic Nebulization," presented at Twenty–First Annual Conference of the Federation of Analytical Chemistry and Spectroscopy, Oct. 2–7, 1994, St. Louis, Missouri (17 pages)..

* cited by examiner

Primary Examiner—Robert H. Spitzer

(57) ABSTRACT

A method for removing trace moisture from a gas is disclosed. The method involves heating a zeolite having a high silica-to-alumina ratio to about 400° C. to remove physically adsorbed water from the zeolite, followed by heating the zeolite to a temperature in excess of 650° C., to form a superheated zeolite. The superheated zeolite is contacted with the gas, thereby adsorbing water from the gas. A dehydroxylated zeolite for removing trace moisture from a gas wherein the zeolite has a high silica-to-alumina ratio and a low level of metallic impurities is also disclosed. A method for removing metallic impurities from a gas using the low metals zeolite is also disclosed. The zeolites and methods of the invention are particularly useful for removing trace water and trace metal impurities from acid gases such as hydrogen chloride and hydrogen bromide.

53 Claims, 20 Drawing Sheets

METHODS FOR REMOVAL OF IMPURITY METALS FROM GASES USING LOW METAL ZEOLITES

Figure 1:
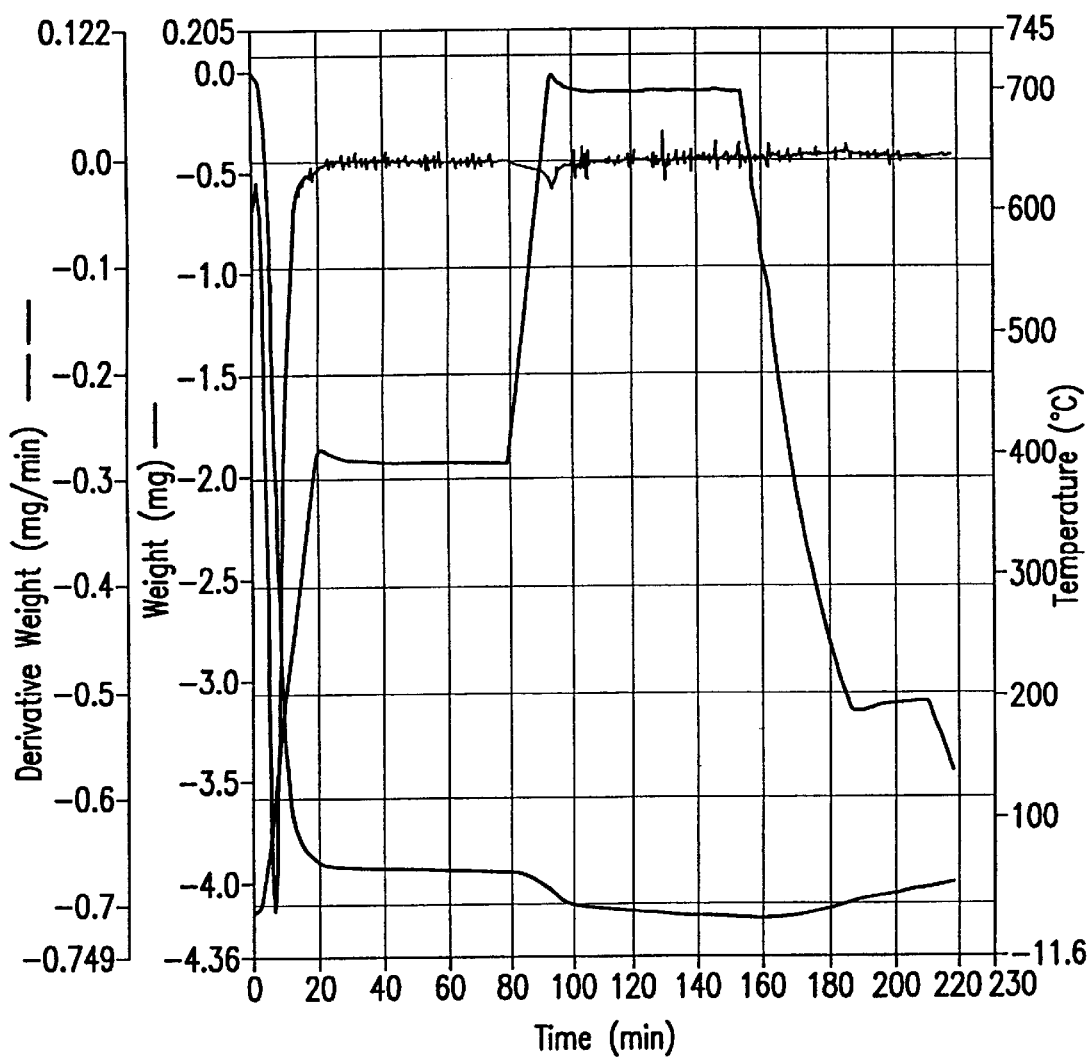

This is a Continuation-in-part of application Ser. No. 09/166,987, filed Oct. 6, 1998, now U.S. Pat. No. 6,110,258.

1. FIELD OF THE INVENTION

The present invention relates to methods for removing water and impurity metals from gases, in particular acid gases, using a zeolite purifier with a high silica-to-alumina ratio, and with low impurity metal levels, especially low titanium levels, which has been heated to at least about 350° C. but preferably to at least about 650° C. The invention also relates to methods for preparing zeolites with low levels of impurity metals.

2. BACKGROUND OF THE INVENTION

A wide range of hydridic, halide and bulk gases are used in processes for manufacture of semiconductor devices and materials. As semiconductor geometries have become smaller and devices more sophisticated, the purity of these gases has become more crucial to the viability and success of semiconductor manufacture.

Water contamination in acid gases used in the production of semiconductors is particularly disadvantageous for a number of reasons. Even trace amounts of water in acid gases such as hydrogen chloride (HCl) and hydrogen bromide (HBr) cause corrosion of the piping, valves and flowmeters used to handle the gases in semiconductor manufacture. The presence of water in these gases can also cause the walls of the cylinders used to store the gases to corrode. Such corrosion leads to the generation of metal particulate contaminants which can become incorporated into the semiconductor device during manufacture. In addition, certain processes used in semiconductor manufacture result in the decomposition of water present in the process gas into $H_2$ and $O_2$. The presence of these gases can result in formation of additional contaminants, particularly oxides, which can also become incorporated into the semiconductor device. Contamination of semiconductor devices with metal particulate and oxide impurities is severely detrimental to the performance of the devices, and often renders the devices deficient or even useless for their intended purpose. Moreover, the corrosion caused by the presence of water in these gases necessitates frequent replacement of expensive piping, manifolds, valves and other gas handling equipment.

Metallic impurities in acid gases can also have a detrimental effect on semiconductor manufacturing processes. Metallic impurities, such as titanium, iron, magnesium, zinc, calcium or aluminum, can become incorporated into the semiconductor devices during manufacture. Contamination of semiconductor devices with such metallic impurities can cause "shorts" or "opens" in the microelectronic circuit, rendering the semiconductor device inoperative. In addition, metallic contamination in acid gases can cause "haze" or "spikes" on wafers after polishing.

A number of materials have been developed for the removal of moisture from acid gases. One such material is a chlorosilylated alumina which is effective for removal of trace moisture from hydrogen chloride, hydrogen bromide, chlorosilanes and chlorine. This material comprises an octahedral alumina substrate with Al—O—Al linkages, which is functionalized with chlorosilyl groups. The material removes water from the gas by an irreversible chemical reaction of the surface chlorosilyl groups with water, and is capable of removing moisture to levels below 0.1 ppm.

There are a number of disadvantages associated with the use of chlorosilylated alumina for removal of trace moisture from acid gases. The preparation of this material is complex and expensive, involving treatment with silicon tetrachloride ($SiCl_4$), which is a corrosive material. Moreover, chlorosilylated alumina is only suitable for applications using low pressure HCl, i.e., about 50 psig or less. At high pressure, the HCl reacts with the alumina, producing aluminum trichloride ($AlCl_3$ or the dimer, $Al_2Cl_6$) which contaminates the purified gas stream. In the case of HBr, contamination with the aluminum halide occurs even at low pressure since HBr is more reactive than HCl and $AlBr_3$ ($Al_2Br_6$) is more volatile than $AlCl_3$ by about an order of magnitude. The leaching of aluminum from chlorosilylated alumina purifiers in this manner causes the structure of the chlorosilylated alumina to degrade, resulting in particulate contamination of the gas, and necessitating frequent replacement of this solid purifier. Moreover, the material requires a preconditioning step with the halide acid gas during which water is initially generated, with a concomitant temperature increase to 120–150° C. This preconditioning step is time consuming and requires the use of a significant quantity of costly halide acid gas. Furthermore, in many applications, the preconditioning must be conducted off-line, so that critical downstream components are not damaged by the initial surge of moisture from the purifier.

Alumino-silicate zeolites, in particular, molecular sieves of the Zeolite A family such as the 3A, 4A and 5A zeolites, are well known moisture adsorbents. However, the Zeolite-A molecular sieves have proved to be unsuitable for drying acid gases such as HCl and HBr. See, e.g., Barrer, R. M. and Kanellopoulos, A. G., 1970, "The Sorption of Ammonium Chloride Vapor in Zeolites. Part I. Hydrogen Chloride and Ammonia," J. OF THE CHEM. SOC. (A):765 (decomposition of 4A molecular sieves was observed upon exposure to hydrogen chloride at a pressure of 228 mm Hg for 18 hours at 50° C.). The stability of the alumino-silicate zeolites to hydrogen chloride has been found to relate to the silica-to-alumina ratio. The higher the silica-to-alumina ratio, the more stable the zeolite is to hydrogen chloride, with zeolites having silica-to-alumina ratios of 10 and above being considered sufficiently stable to HCl. In contrast, the Type A and Type X (synthetic faujasite) zeolites have silica-to-alumina ratios of 2 and 2.5, respectively, which do not provide them with sufficient stability towards hydrogen chloride.

One type of zeolite with a high silica-to-alumina ratio which is used to remove trace water from acid gases is known as the type AW-300 molecular sieve, which is commercially available from UOP. AW-300 is a natural mordenite-type zeolite, which has the structure $M_2O.Al_2O_3.10SiO_2.6H_2O$, M being an alkali metal such as Na; a silica-to-alumina ratio of 10, and a pore size of 4 angstroms. This type of mordenite has been reported as useful for removing water from gas mixtures containing hydrogen chloride, such as reformer recycle hydrogen, flue gas, chloroform, trichloroethylene, vinyl chloride, and chlorine. Collins, J. J., "A Report On Acid-Resistant Molecular Sieve Types AW-300 and AW-500," Molecular Sieves Product Data Sheet, Union Carbide International Co., 270 Park Avenue, New York, N.Y. 10017. Regeneration of the zeolite is accomplished by desorbing the water by purging with a hot gas at 300–600° F. (150–315° C.). Id See also "Method for Dehydrating Butadiene-Hydrogen Chloride Mixture," Japanese Kokai 77 89,602 (Cl. C07C11/16) Jul. 27, 1977 [c.f. CA 87:202855q]. Activated synthetic mordenite has also been reported to be useful for drying hydrogen chloride.

"Purification of Acidic Gases By Synthetic Mordenite," Japanese Kokai Tokyo Koho JP 61 54,235 [86 54,235] [c.f. CA 105:8642t]; "Zeolite For Purification of Chlorine or Hydrogen Chloride for Semiconductor Use," Japanese Kokai 77 65,194 (cl. C01B7/02), May 30, 1977 [c.f. CA:87:103913a].

The acid-resistant mordenite-type zeolites such as AW-300 have an advantage over chlorosilylated alumina purifiers in that they are stable against alumina leaching due to the fact that the zeolite structure contains isolated tetrahedral $AlO_2$ units residing within a tetrahedral silica matrix. These units create water adsorption sites that are related to the ion exchange properties and capacity of the zeolite. In contrast, the alumina of chlorosilylated alumina is octahedral and has Al—O—Al chemical linkages which are more vulnerable to attack and destruction by acid gases.

While the high silica mordenites have certain advantages over chlorosilylated aluminas, they are not without disadvantages. Chlorosilylated aluminas purify by an irreversible chemical reaction of surface chlorosilyl groups with water, while high silica mordenites purify primarily by physical adsorption of the water, which is a reversible process. As a result, only a small amount of water can be removed from the gas during purification over high silica mordenites before water desorption becomes significant. In addition, since the efficiency of water removal by physical adsorption is lower than that of a chemical reaction, the high silica mordenites are less effective than chlorosilylated aluminas under parallel conditions.

Although the high silica mordenites do not suffer from the problem of alumina leaching associated with chlorosilylated aluminas, these zeolites typically generate unacceptable levels of metallic impurities when exposed to acid gases. These undesirable metallic emissions are less of a problem in the case of a synthetic mordenite with lower metallic impurities. However, these zeolites still possess metallic impurities which may be emitted under certain conditions, especially when the zeolite is used to purify corrosive gases, such as HCl, in particular high-pressure HCl. Thus, in wafer fabrication, ppm-level titanium impurities in HCl, originating from the zeolite purifier, have been blamed for "haze" and "spikes" observed on wafers after polishing.

Therefore, there is a need in the art for an acid gas resistant zeolite material that is capable of removing trace water from acid gases to very low levels, which does not generate unacceptable levels of metallic impurities, especially titanium, when exposed to acid gases, and which does not require moisture-generating, expensive preconditioning with the acid gas to remove these metallic contaminants. Further, there is a need in the art for a zeolite for removing trace water from acid gases suitable for both applications at low pressure, and at full cylinder pressure. In addition, there is a need in the art for a zeolite for removing metallic impurities from acid gases.

Other methods of removing water contamination from acid gases which do not rely on the use of zeolites have been reported. For example, U.S. Pat. No. 4,844,719 to Toyomoto et al. discloses a method for desiccating a water-containing gas such as hydrogen chloride which comprises contacting the gas with one side of a permeable polymer membrane made of a fluorine type copolymer, and either bringing a dry purge gas into contact with the other side of the membrane, or reducing the pressure on the other side of the membrane, thereby removing water from the gas.

U.S. Pat. No. 4,925,646 to Tom et al. discloses a process for drying a gaseous hydrogen halide such as HCl, HBr, HF or HI. The method comprises contacting the gaseous hydrogen halide with an alkylated precursor composition which comprises metal alkyl compounds dispersed throughout a support and/or metal alkyl pendant functional groups covalently bound to a support. The gaseous hydrogen halide reacts with the metal alkyl to form a scavenger composition comprising the corresponding metal halide. The method further comprises contacting the scavenger composition with the water impurity-containing gaseous hydrogen halide, causing the metal halide to react with the water impurity to yield the corresponding hydrates and/or oxides of the metal halide, and recovering an essentially water-free gaseous hydrogen halide having a water concentration of below 0.1 ppm by volume.

U.S. Pat. No. 4,564,509 to Shealy et al. discloses a method for removing oxygen, water vapor and other oxygen bearing gas species from reactant gases by bubbling the reactant gas through liquid phase ternary melt of gallium-indium and an active gathering material selected from calcium, lithium, aluminum or magnesium. The oxygen in the gas reacts with the active gathering material, forming oxides. The method may be used to remove oxygen and water from hydrogen chloride.

U.S. Pat. No. 4,663,052 to Sherman et al. discloses the use of chabazite which contains a potassium, rubidium or cesium cation in a method to dry "acidic streams," such as reformer recycle hydrogen, flue gas, chloroform, trichloroethylene, vinyl chloride, chlorine, and generated hydrogen, which contain HCl as an acid component (col. 5, lines 5–17). The chabazite adsorbent of Sherman et al. is activated at a temperature of 100° C. or greater, preferably between 200° to 600° C., in the presence of air or other gases (col. 5, lines 51–58).

However, these methods can result in contamination of the gas with other impurities such as oxides or metals. Moreover, these methods are generally not practical on the large scale required in semiconductor manufacturing.

Thus, there is a need in the art for a material that is capable of removing trace amounts of water from an acid gas, which is resistant to reaction with the acid gas, and in particular, which is resistant to leaching of aluminum and other metals—including trace metals such as transition metals— and to physical degradation. Further, there is a need in the art for a moisture-absorbing material which is capable of removing trace amounts of water from an acid gas at low as well as high pressure, which does not require a time consuming, expensive preconditioning step with the acid gas during which water is initially generated, with a concomitant temperature increase. In addition, there is a need in the art for a material which is capable of removing metallic impurities from an acid gas.

3. SUMMARY OF THE INVENTION

The present invention encompasses a method for removing water from a gas, in particular from an acid gas such as hydrogen chloride or hydrogen bromide, which comprises contacting the gas with a zeolite having a high silica-to-alumina ratio, wherein the zeolite has been heated prior to contacting it with the gas to a temperature above about 650° C. Preferably, such heating is sufficient to remove an amount of water from the zeolite, believed to be produced by dehydroxylation of the zeolite, but insufficient to cause chemical and physical destruction of the zeolite.

The present invention is also directed to a method for removing water from a gas comprising heating a zeolite of high silica-to-alumina ratio and of low contaminant metal levels to a temperature of about 400° C. for a period of time sufficient to desorb a first amount of water that is physically adsorbed onto the zeolite, wherein the zeolite has a high silica-to-alumina ratio, followed by heating the zeolite to a temperature above about 650° C. for a period of time sufficient to remove a second amount of water from the zeolite, believed to be produced by dehydroxylation of the zeolite, thereby forming a superheated zeolite, and subsequently contacting the superheated zeolite with the gas, and allowing the superheated zeolite to absorb the water from the gas.

The present invention also relates to a superheated zeolite, which has been heated to a temperature above about 650° C. sufficient to remove an amount of water from the zeolite, which is believed to be removed from the zeolite by dehydroxylation, wherein the superheated zeolite has a high silica-to-alumina ratio, and low metals content.

The present invention is also directed to a method of preparing a dehydroxylated zeolite, comprising heating the zeolite to a temperature of about 400° C. for a period of time sufficient to desorb a first amount of water that is physically adsorbed on the zeolite, followed by heating the zeolite to a temperature of above about 650° C. for a period of time sufficient to remove a second amount of water from the zeolite by dehydroxylation of the zeolite.

The present invention is also directed to a method of preparing a zeolite having a low concentration of metallic impurities, wherein the zeolite has a silica-to-alumina ratio of above about 10, comprising heating the zeolite to a temperature above about 400° C. for a period of time sufficient to desorb water that is physically adsorbed on the zeolite, and contacting the zeolite with an acid gas for a period of time sufficient to reduce the metallic impurity concentration in the zeolite to less than about 70 ppm. The method optionally further comprises heating the zeolite to a temperature above about 650° C. for a period of time sufficient to remove a second amount of water from the zeolite by dehydroxylation of the zeolite. The method also optionally comprises the step of cooling the zeolite to a temperature less than about 300° C., preferably to ambient temperature, prior to contacting the zeolite with the gas. The present invention is also directed to a zeolite prepared by this method. In particular, the present invention is directed to a zeolite which has a silica-to-alumina ratio of above about 10, wherein the zeolite has been first heated to a temperature above about 400° C. for a time sufficient to cause desorption of water that is physically adsorbed on the zeolite and then cooled to ambient temperature and subsequently contacted with an acid gas, and wherein the zeolite has a titanium concentration of less than about 20 ppm, an iron concentration of less than about 100 ppm, and a magnesium concentration of less than about 11 ppm.

The present invention is also directed to a method of removing metallic impurities from a gas, particularly an acid gas, comprising heating a zeolite to a temperature above about 400° C. and contacting said gas with the zeolite, wherein the zeolite has a silica-to-alumina ratio of above about 10 and a low concentration of metallic impurities, and contacting said gas with the zeolite. The method optionally further comprises heating the zeolite to a temperature above about 650° C. prior to contacting it with said gas. The method also optionally comprises the step of cooling the zeolite to a temperature less than about 300° C., preferably to ambient temperature, prior to contacting the gas with the zeolite.

4. BRIEF DESCRIPTION OF THE FIGURES

FIG. 1: Thermogravimetric Analysis (TGA) scan of a 65.9 mg sample of a mordenite zeolite manufactured by Tosoh, Japan. The TGA scan was run as described in Example 1(A).

Figure 2:
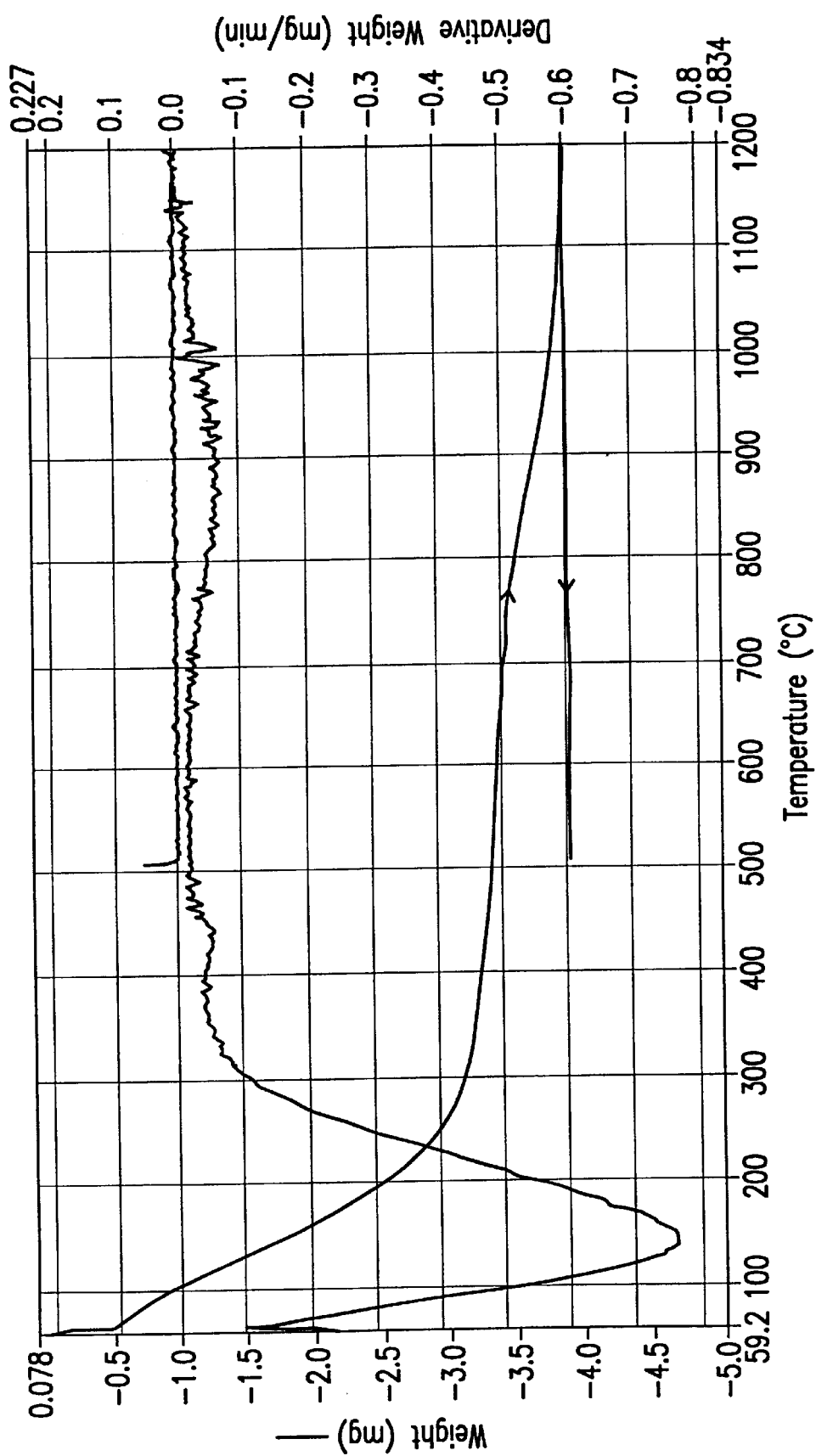

FIG. 2: TGA scan of a 64.7 mg sample of Tosoh mordenite zeolite. The TGA scan shows a main $H_2O$ desorption (weight loss) peak centered at 140° C., and a second peak centered at about 890° C. The TGA scan was run as described in Example 1(B).

Figure 3:
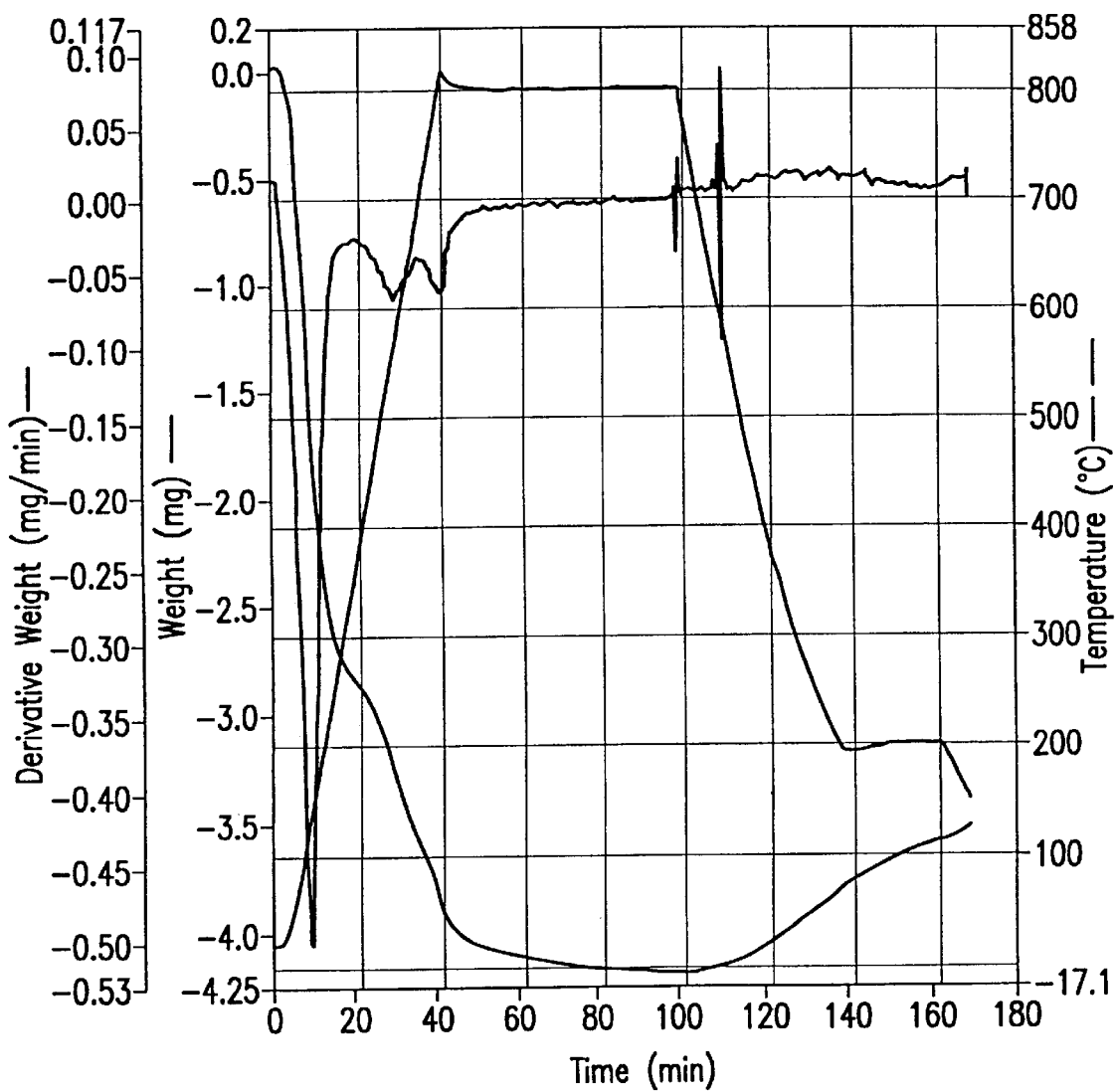

FIG. 3: TGA scan of a 68.7 mg sample of United Catalysts (UC) mordenite zeolite heated to 800° C. The TGA scan shows a main low-temperature water peak and two high-temperature peaks at about 580° C. and about 800° C. The TGA scan was run as described in Example 1(C).

Figure 4:
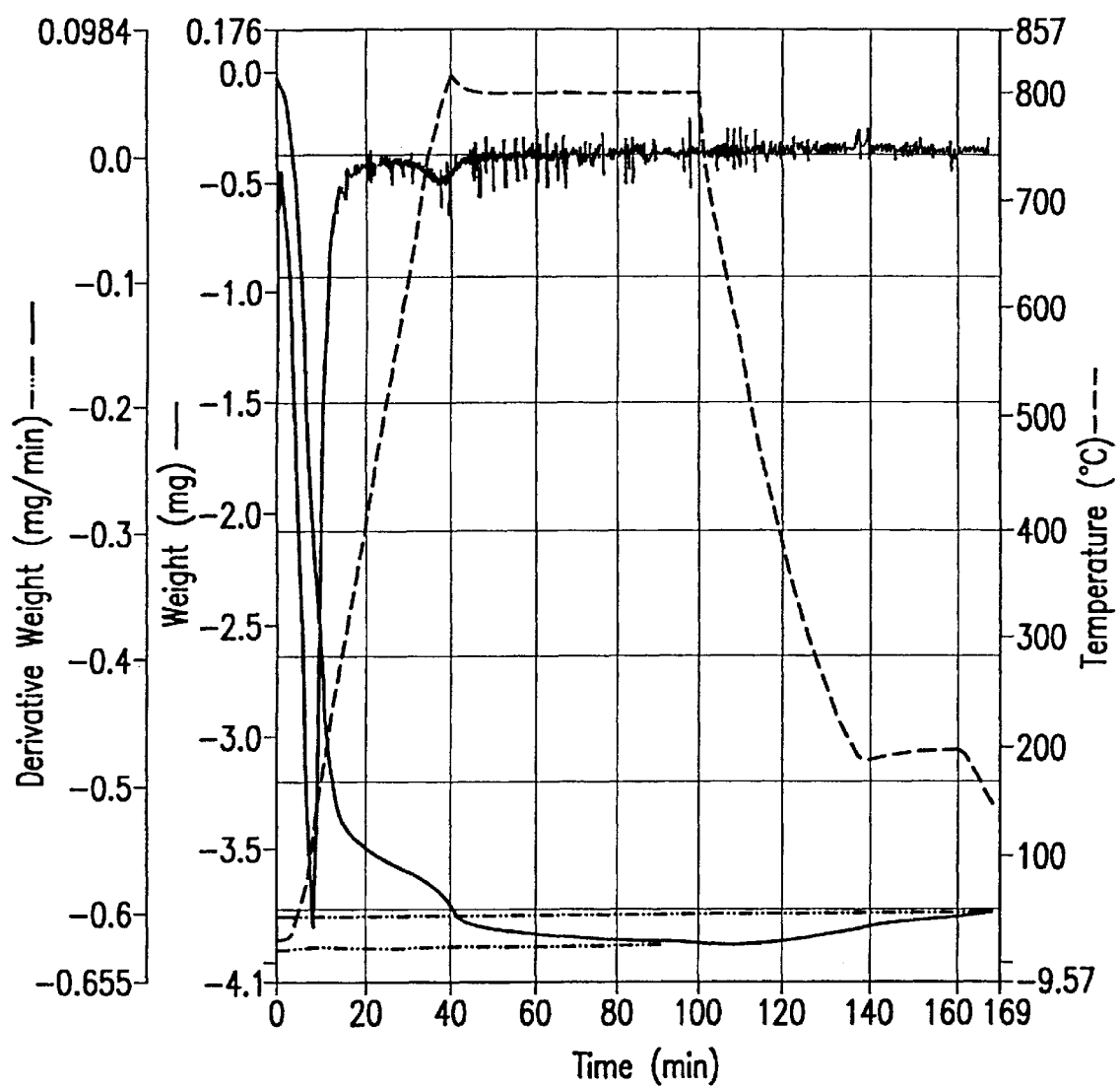

FIG. 4: TGA scan of a 66.6 mg sample of Tosoh mordenite zeolite. The TGA scan shows that the sample loses water in an amount of about 3.5% by weight of the sample at low temperature (peak at 130° C.) and water in an amount of about 0.3% by weight of the sample at about 800° C. The TGA scan was run as described in Example 1(D).

Figure 5:
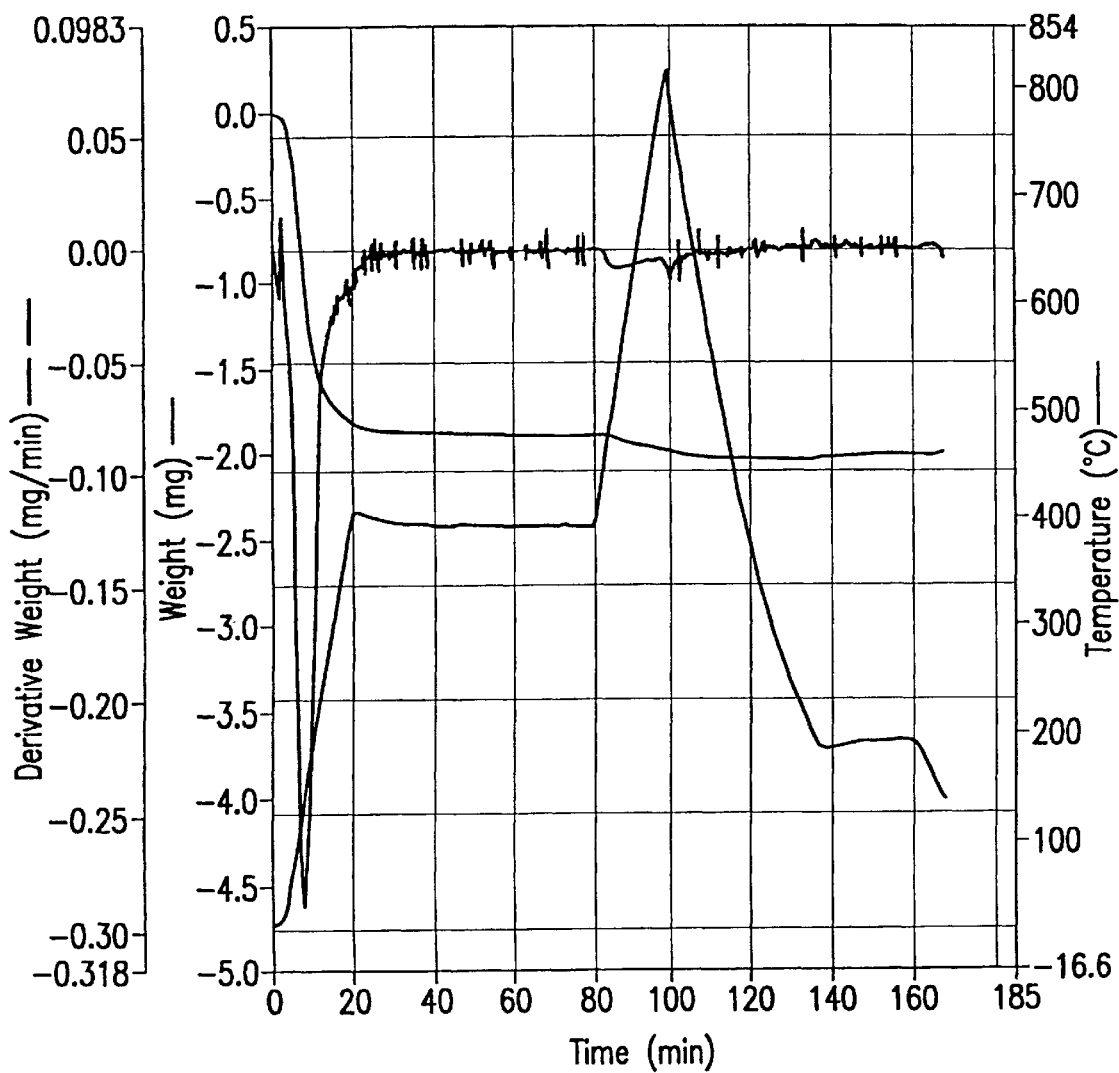

FIG. 5: TGA scan of a 66.6 mg sample of Tosoh mordenite zeolite, which shows low and high temperature water peaks for the Tosoh mordenite zeolite as obtained during staged heating to 400 and 800° C. The TGA scan was run as described in Example 1(E).

Figure 6:
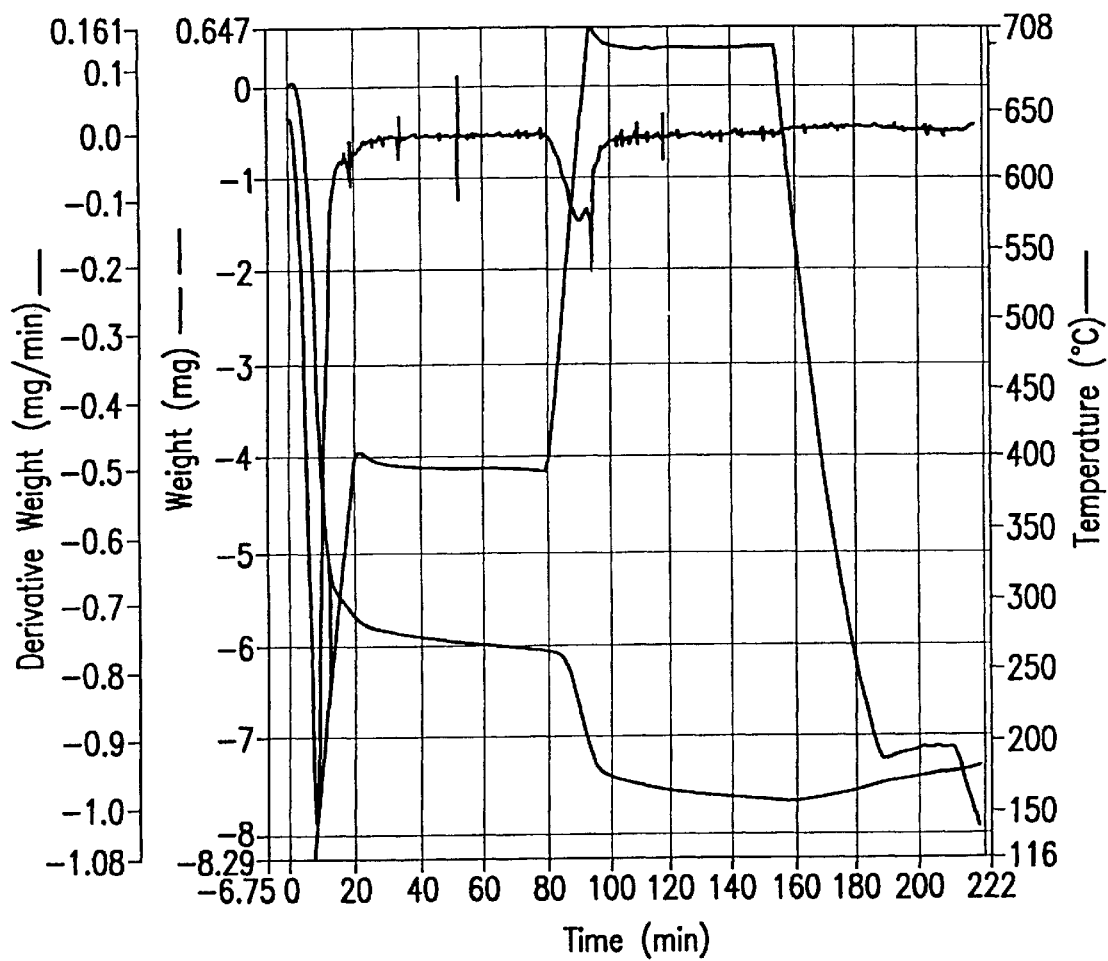

FIG. 6: TGA scan of staged heating to 400 and 700° C. of a 119.3 mg sample of United Catalysts (UC) mordenite zeolite. The TGA scan shows that there is more water loss at high temperature, ie., about 1.3% of dehydrated sample. The TGA scan was run as described in Example 1(F).

Figure 7:
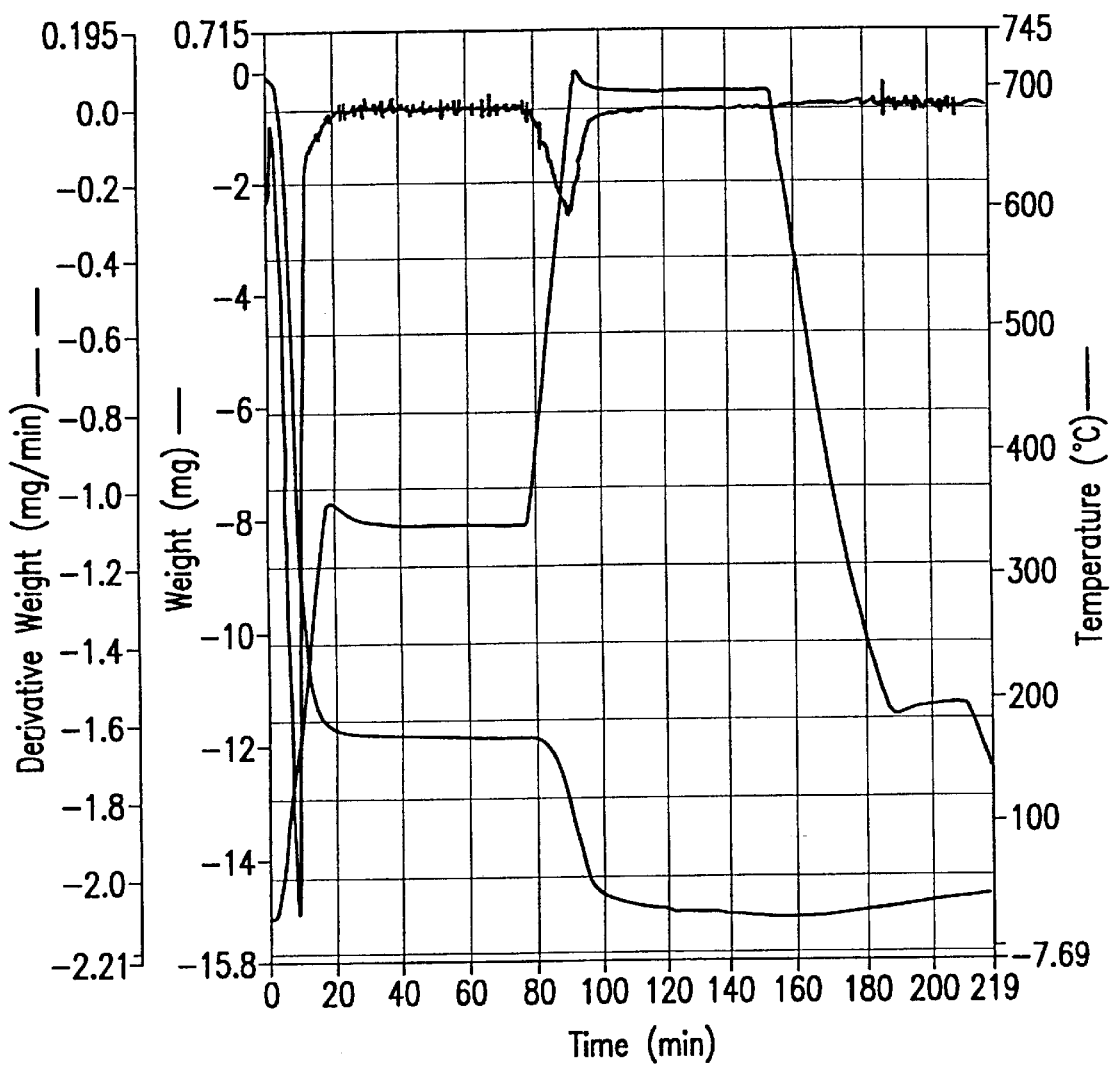

FIG. 7: TGA scan of staged heating of a 245.4 mg sample of United Catalysts (UC) mordenite zeolite to 3500 and 700° C. The TGA scan was run as described in Example 1(G).

Figure 8:
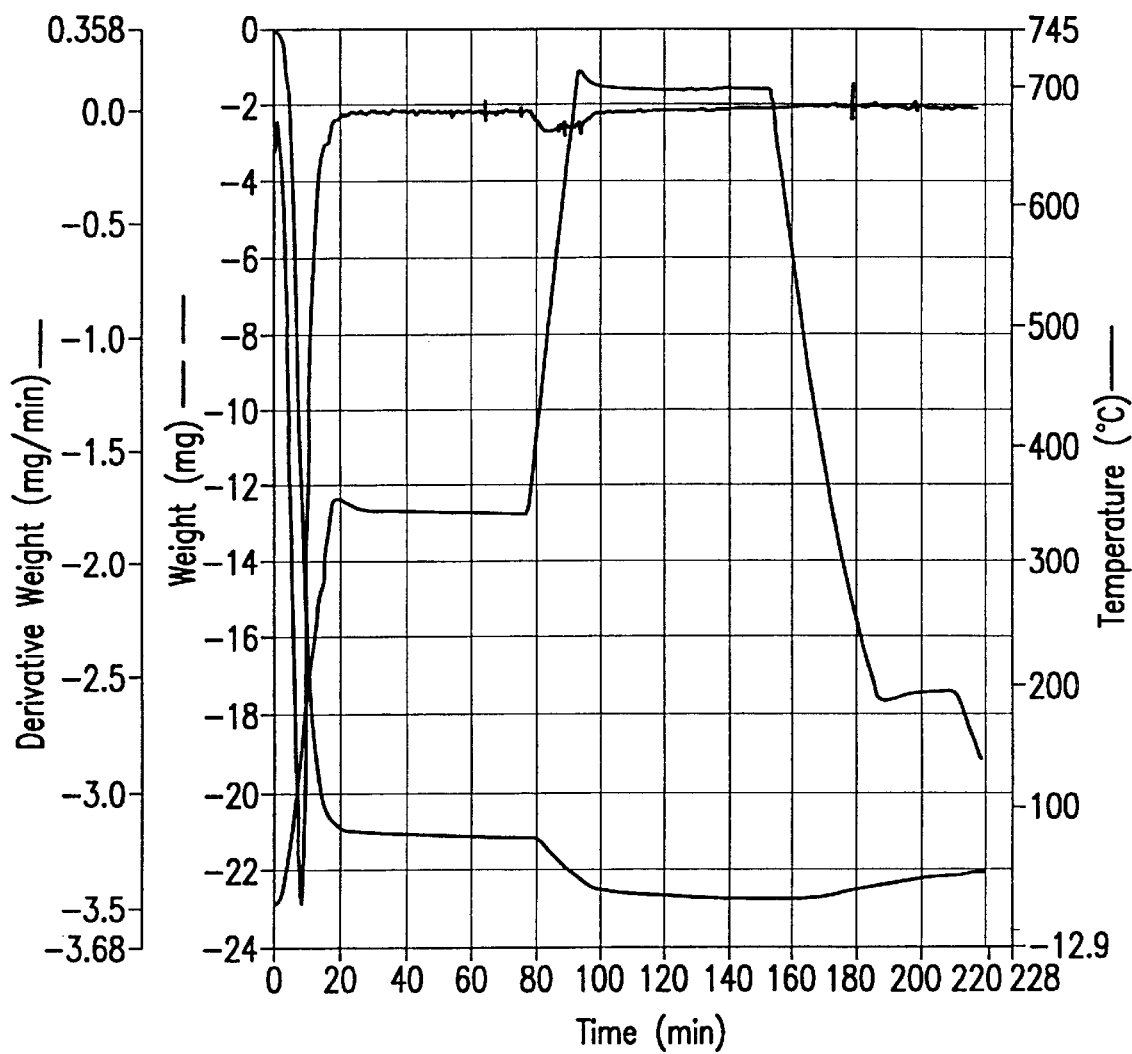

FIG. 8: TGA scan of re-run of the 245.4 mg sample of FIG. 7 (Example 1(G)) after rehydration of the sample at ambient conditions (about 25% humidity). The TGA scan shows that significantly less high temperature water is desorbed. The TGA scan was run as described in Example 1(H).

Figure 9:
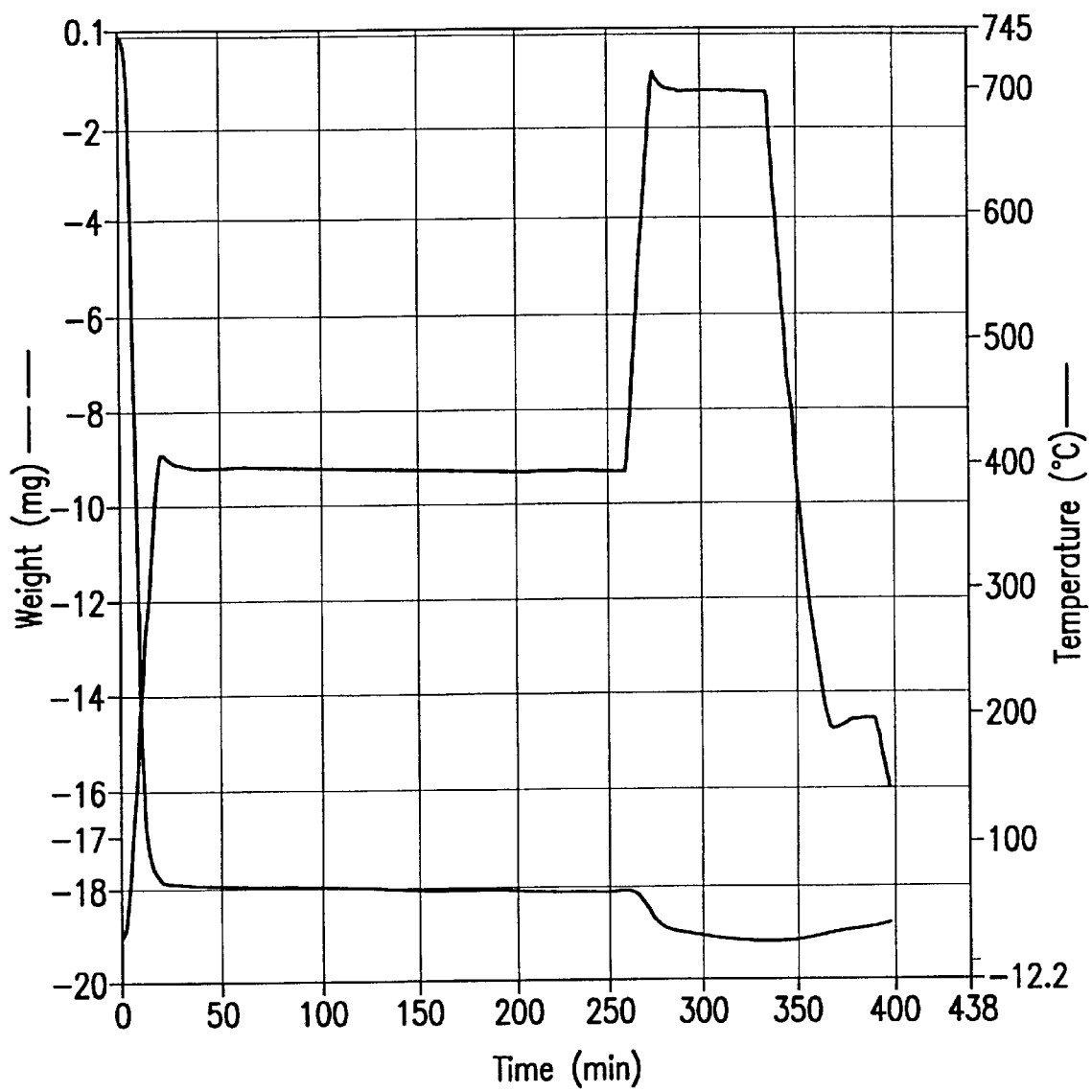

FIG. 9: TGA scan of staged heating of a 329.2 mg sample of Tosoh mordenite zeolite. The TGA scan was run as described in Example 1(I).

Figure 10:
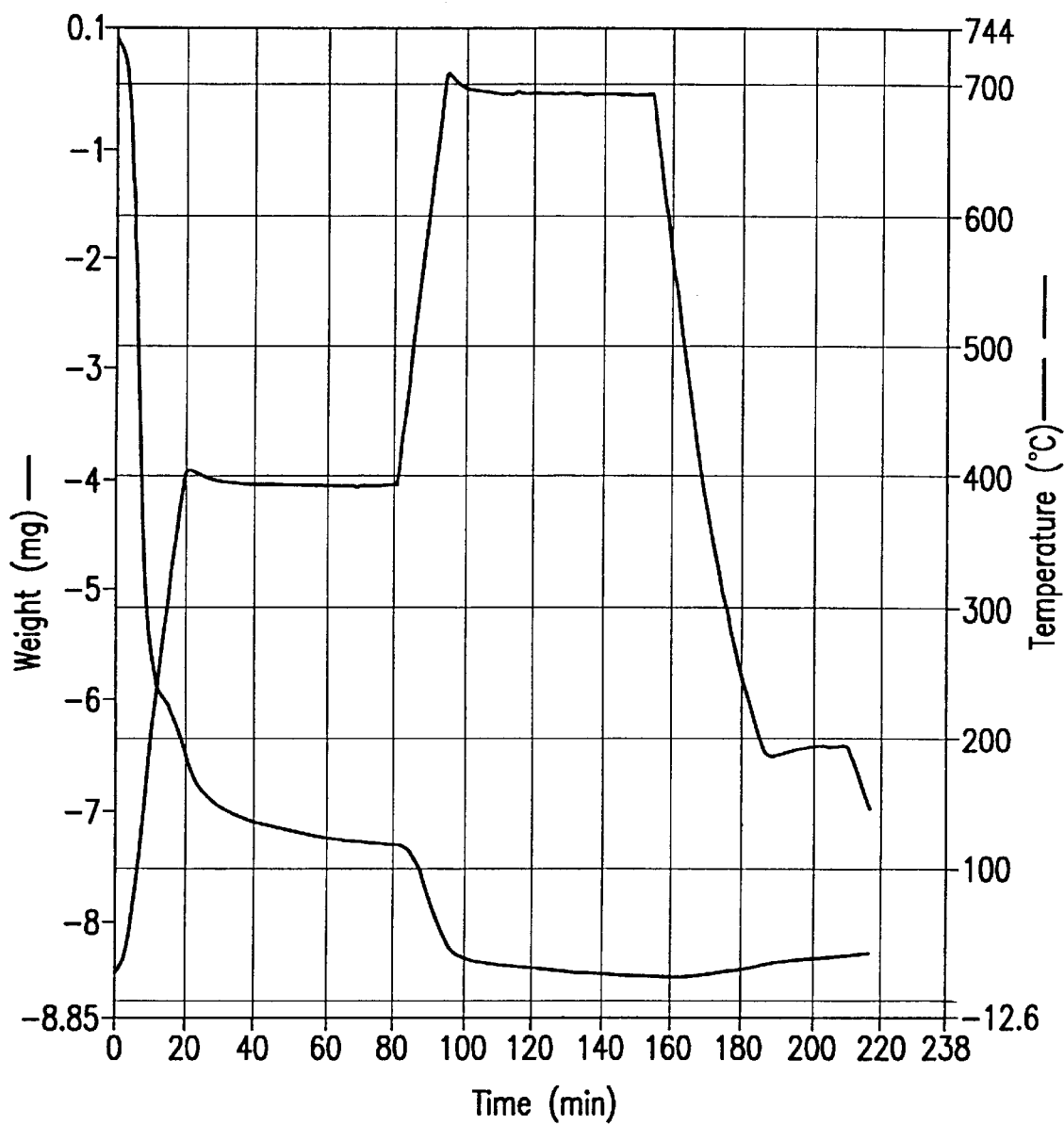

FIG. 10: TGA scan of a 69.0 mg sample of PQ mordenite zeolite stage-heated to 400 and 700° C. The TGA scan shows that about 15% of weight loss occurs during second temperature ramping. The TGA scan was run as described in Example 1(J).

Figure 11:
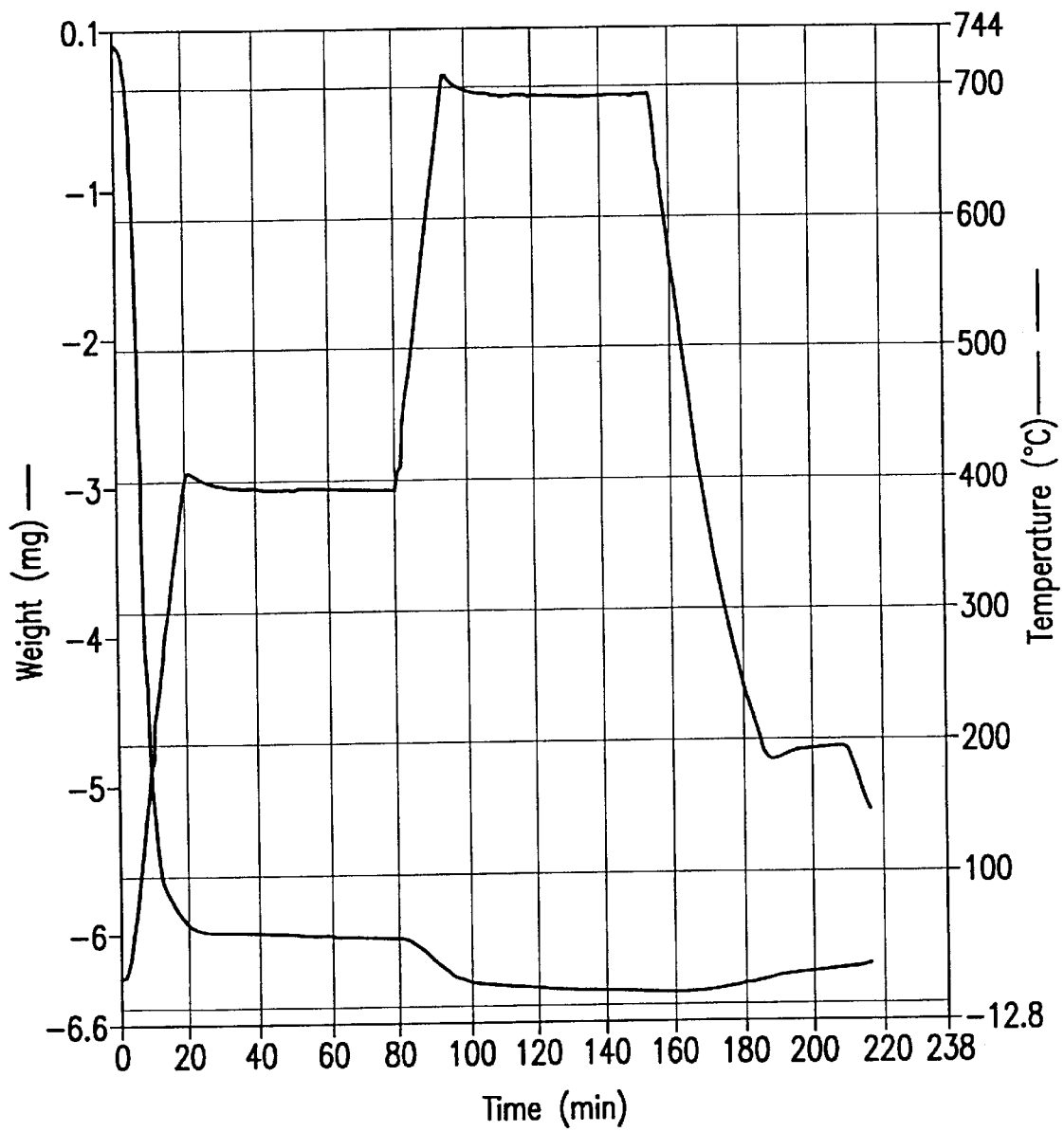

FIG. 11: TGA scan of repeat of FIG. 10 (Example 1(J)). The TGA scan shows that weight loss at high temperature is about one-third of what it was before. The TGA scan was run as described in Example 1(J).

Figure 12:
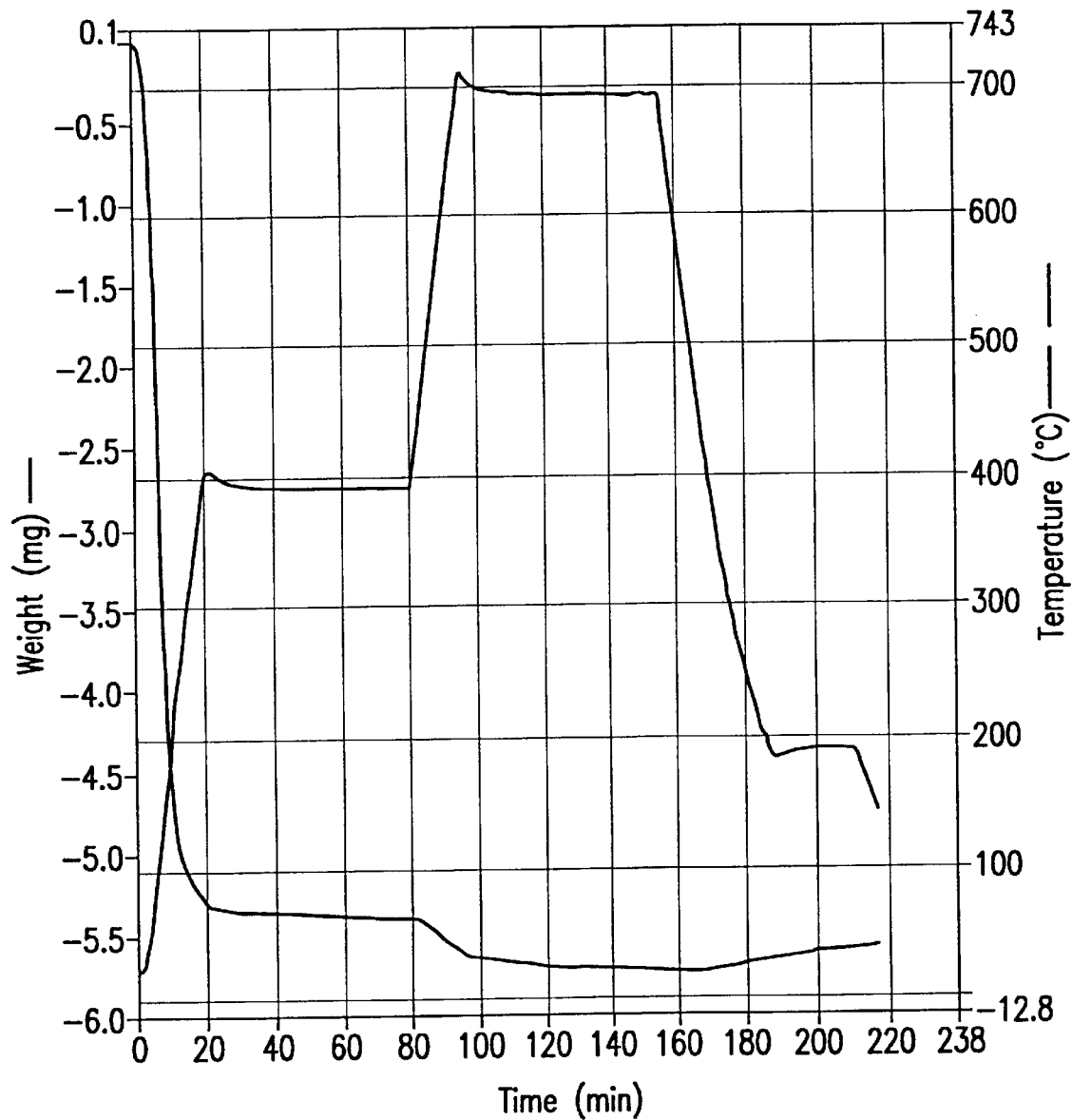

FIG. 12: Repeat TGA scan of the TGA scan shown in FIG. 11, run as described in Example 1(J). The repeat TGA scan shows essentially the same results.

Figure 13:
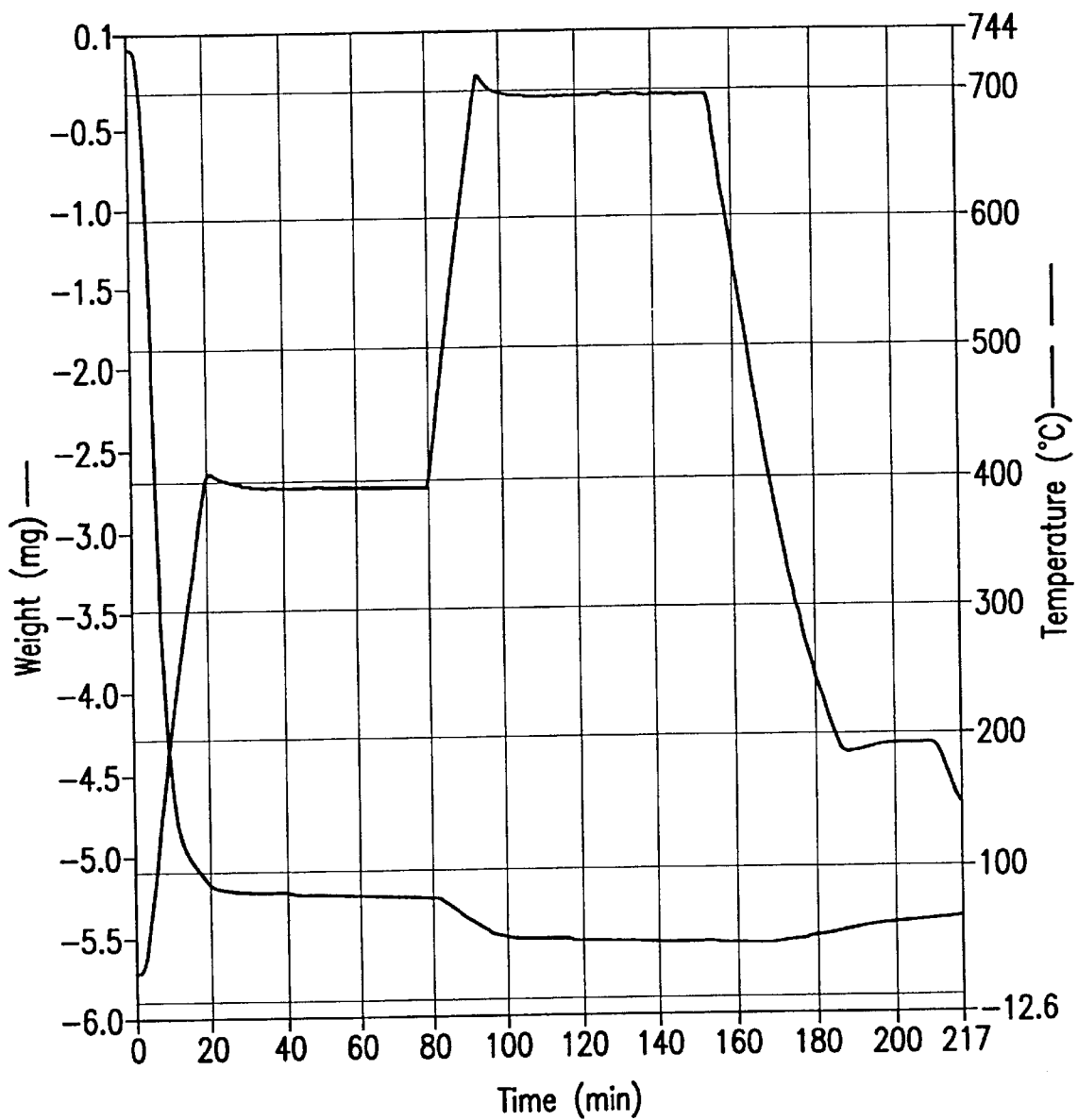

FIG. 13: Repeat TGA scan of the TGA scan shown in FIG. 12, run as described in Example 1(J). The repeat TGA scan shows essentially the same results.

Figure 14:
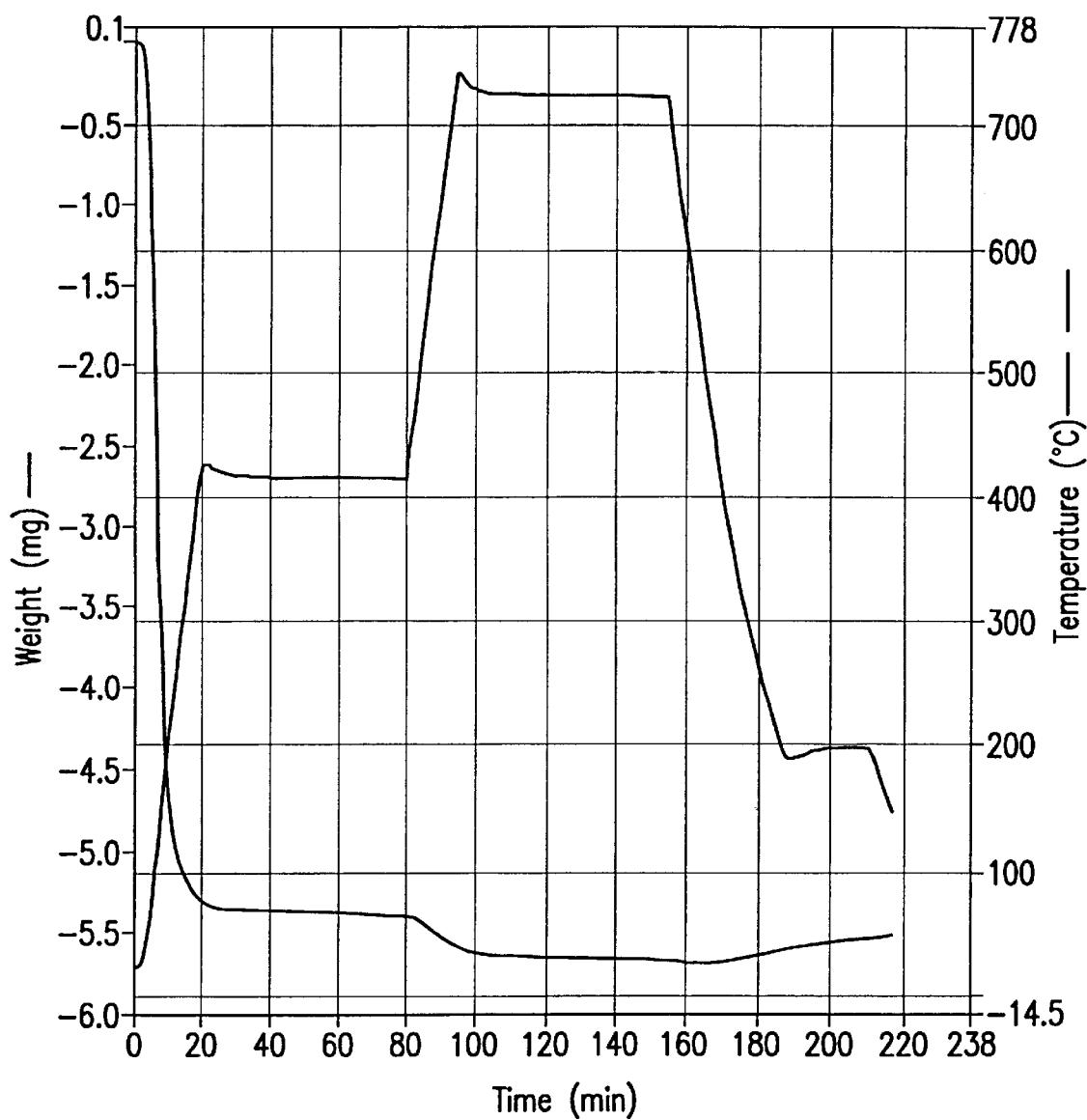

FIG. 14: Repeat TGA scan of the TGA scan shown in FIG. 13, run as described in Example 1(J). The repeat TGA scan shows essentially the same results. The TGA scans of FIGS. 10, 11, 12 and 13 demonstrate that reproducibility of water removal from calcined—rehydrated mordenite is excellent. About one-half percent weight loss occurs above 400° C. (about 5% of entire weight loss).

Figure 15:
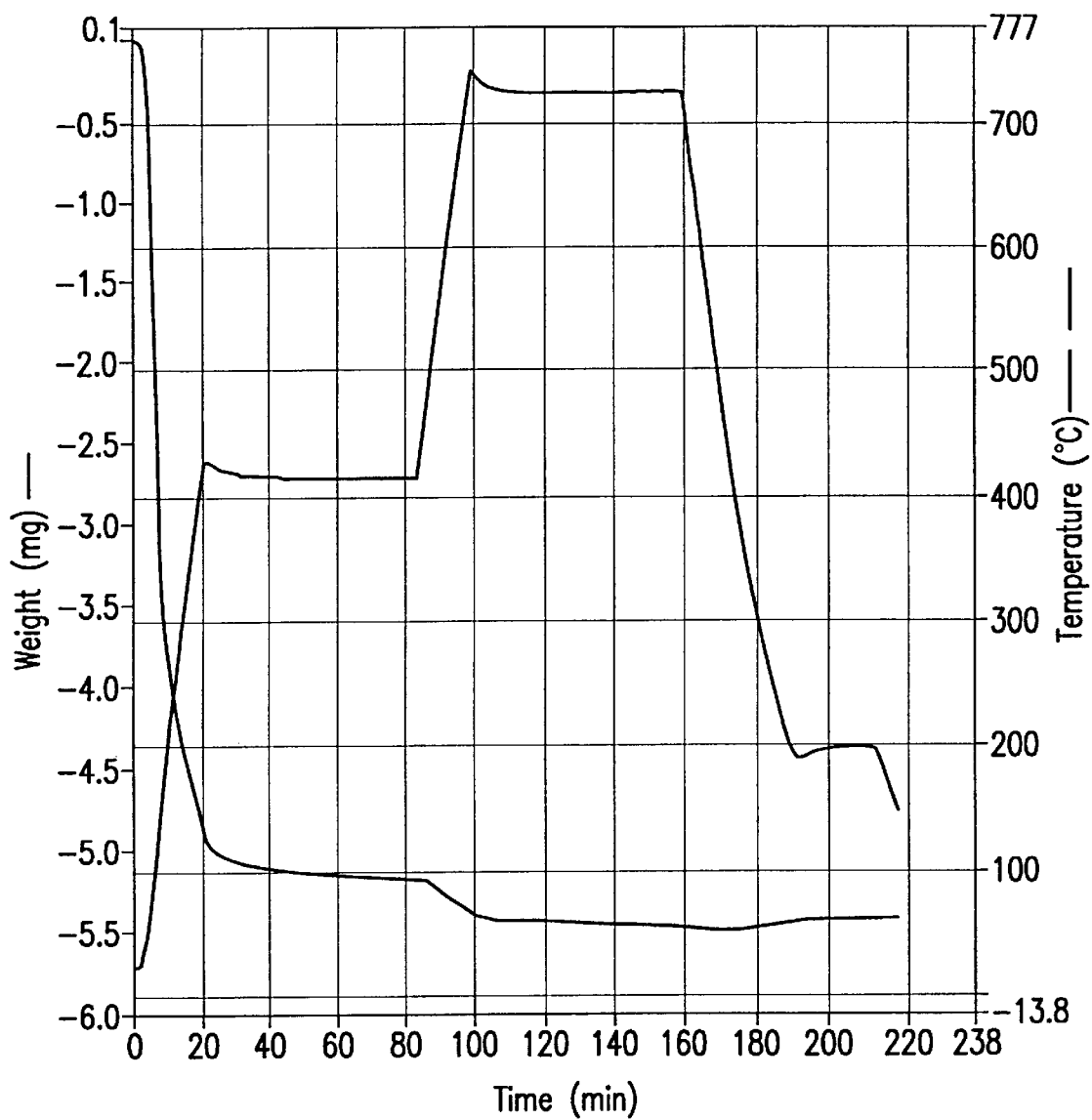

FIG. 15: TGA scan of a 46.1 mg sample of PQ mordenite zeolite beta stage heated to 400 and 700° C. The TGA scan shows 5.2 mg weight loss during first ramping (11% by weight of the sample), and 0.3 mg weight loss during second ramping (0.5% by weight of the sample). The TGA scan was run as described in Example 1(K).

Figure 16:
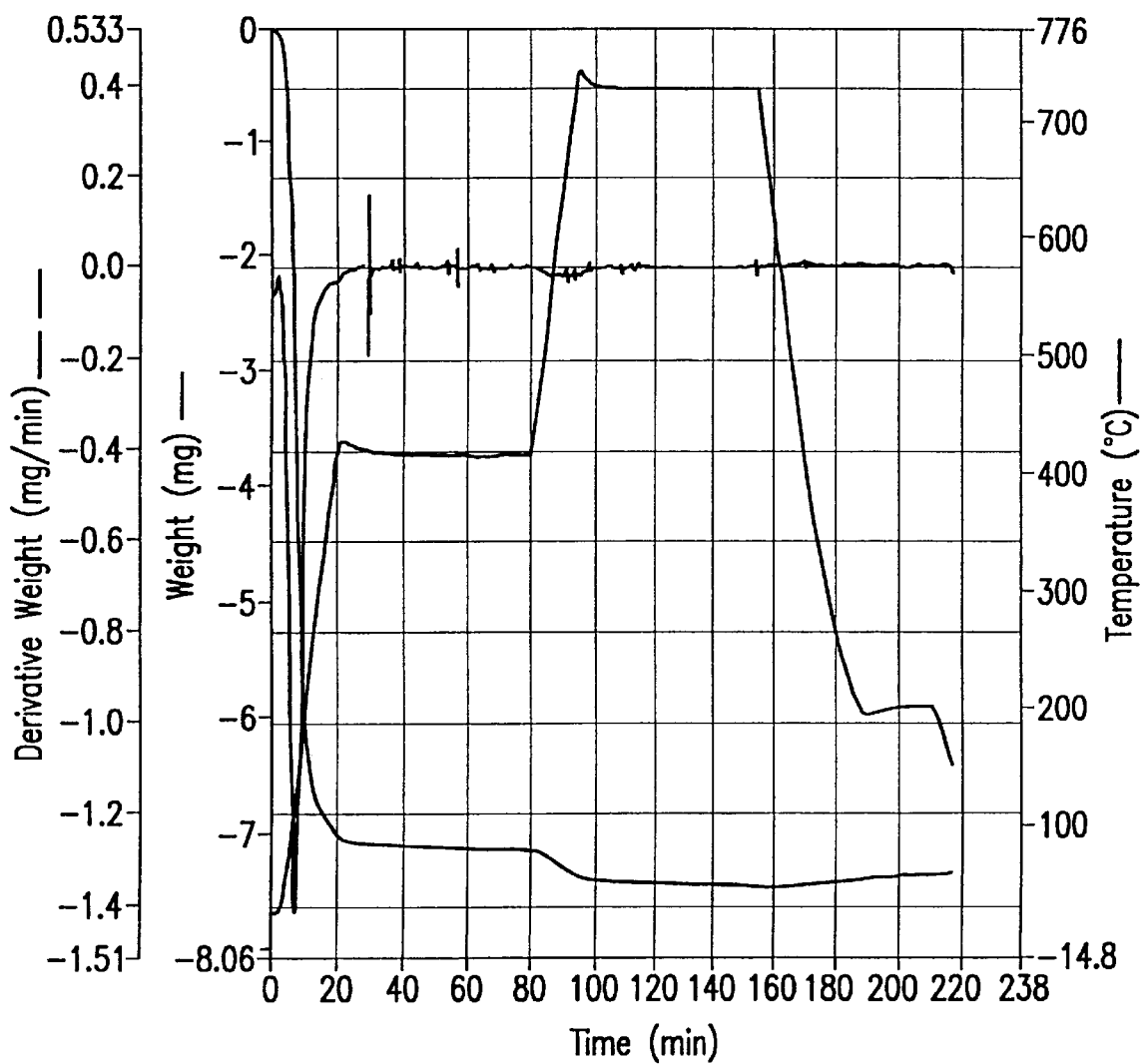

FIG. 16: TGA scan of a sample of PQ Type Y zeolite stage heated to 400 and 700° C. The TGA scan shows that about 0.5% of the weight loss occurs during second ramping. The PQ Type Y zeolite has essentially similar behavior to mordenite. The TGA scan was run as described in Example 1(L).

Figure 17:
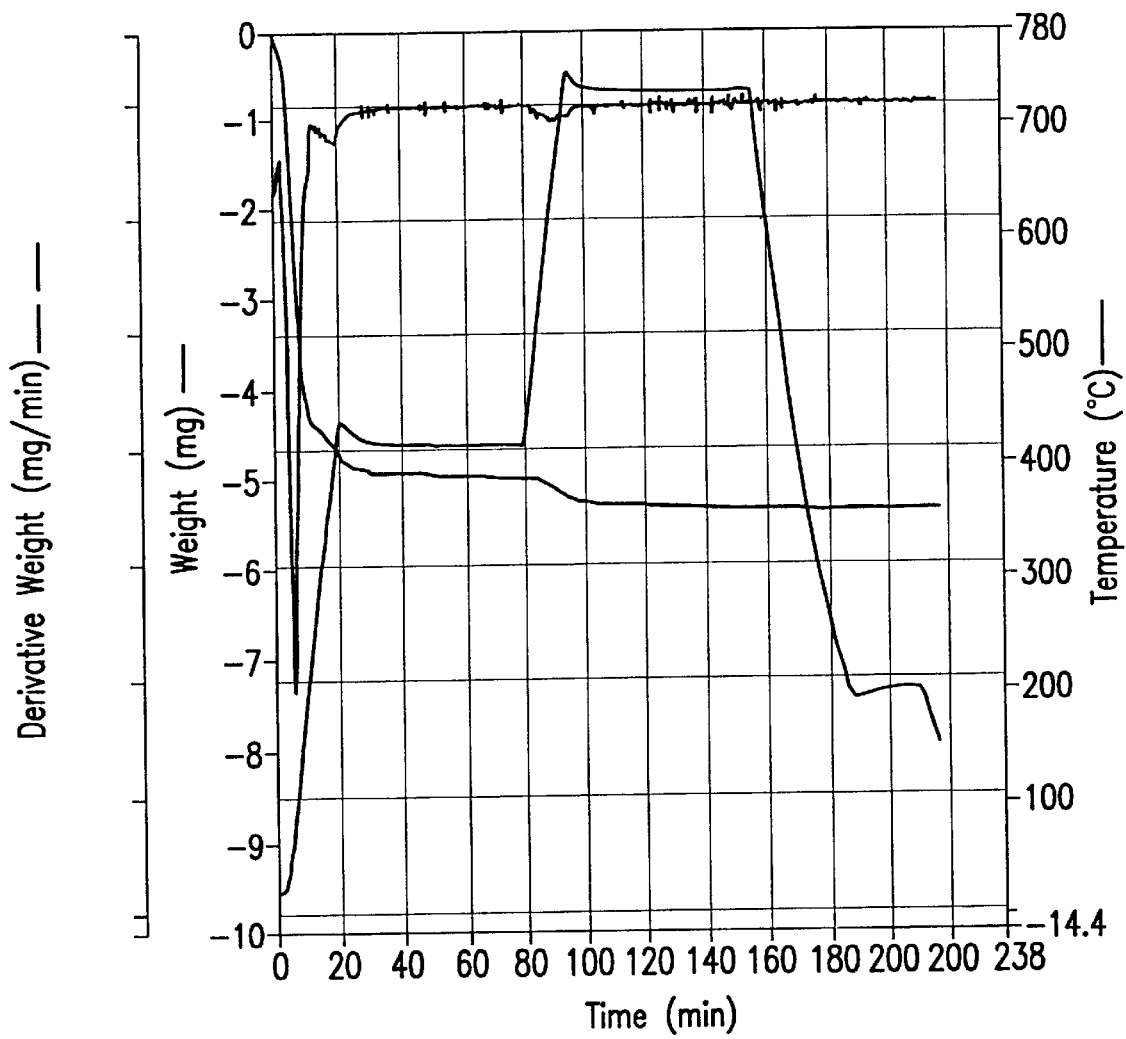

FIG. 17: TGA scan of a 73.8 mg sample of PQ ZSM-5 stage heated to 400 and 700° C. The TGA scan shows about 5.0 mg weight loss during first ramping (about 6.5% by weight of the sample), and about 0.3 mg weight loss during second ramping (0.4% by weight of the sample). The TGA scan was run as described in Example 1(M).

Figure 18:
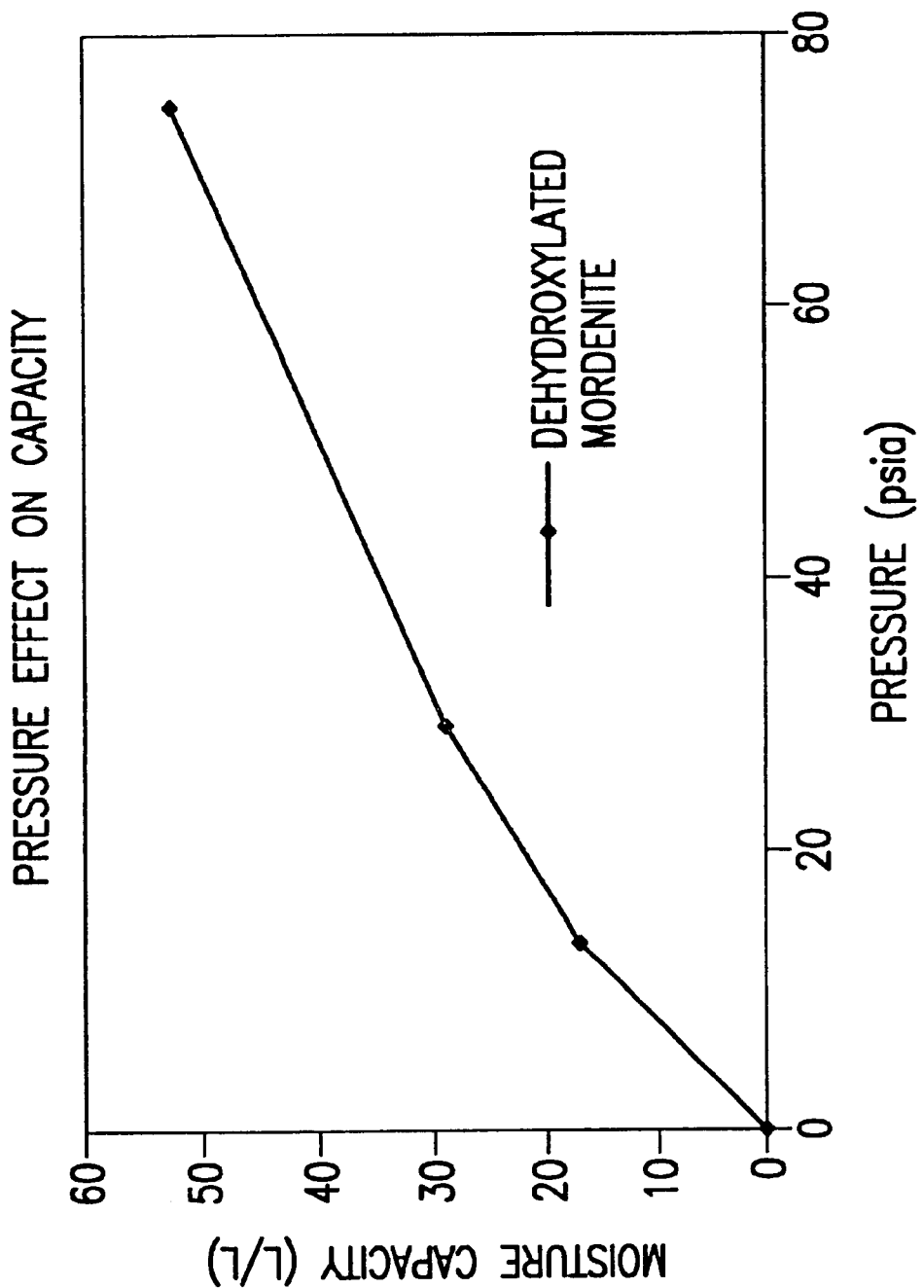

FIG. 18: Graph depicting the effect of gas pressure (psia) on the water capacity (L/L) of dehydroxylated mordenite, as described in Example 4. The graph shows the effect of pressure on the adsorption of water onto the purifier, and that using high pressure matrix gas can dramatically increase the purifier capacity.

Figure 19:
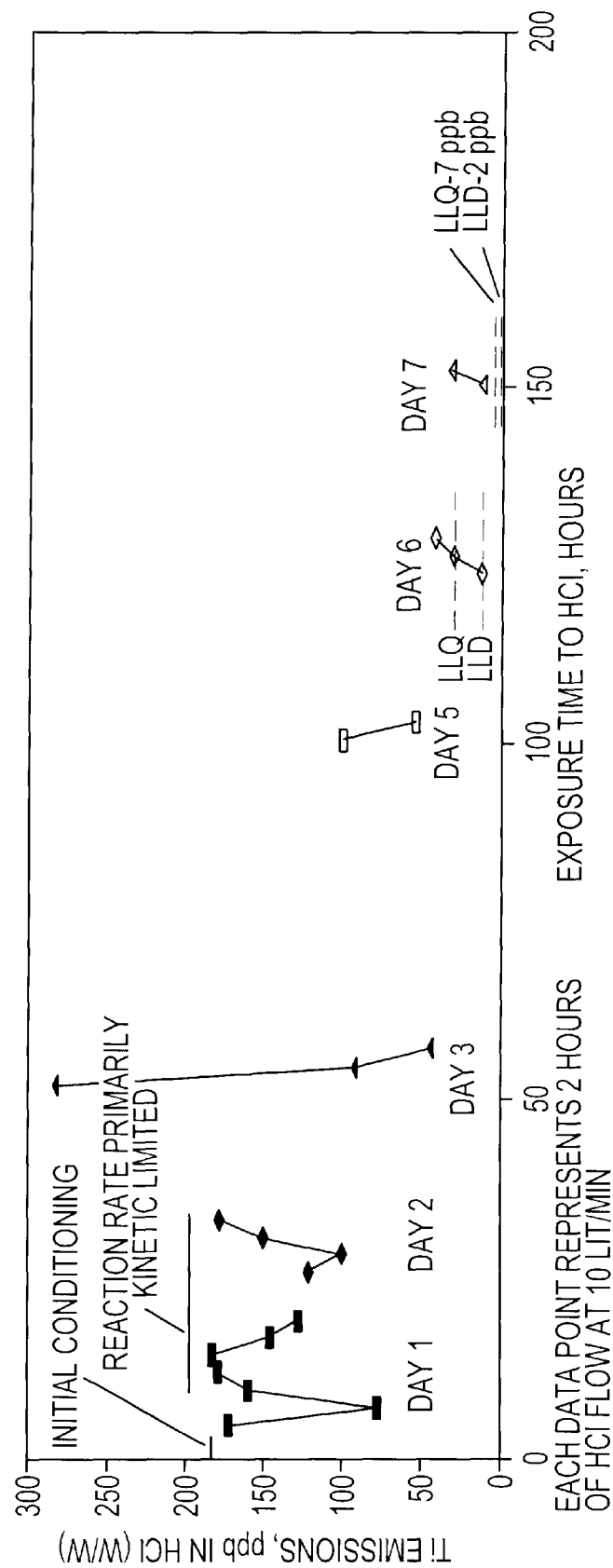

FIG. 19: Graph depicting the titanium emissions from the Tosoh mordenite zeolite upon exposure to high pressure hydrogen chloride gas over a period of about 150 hours. The Tosoh mordenite has an initial titanium concentration of 90 ppm. The emissions were measured in Example 6(D).

Figure 20:
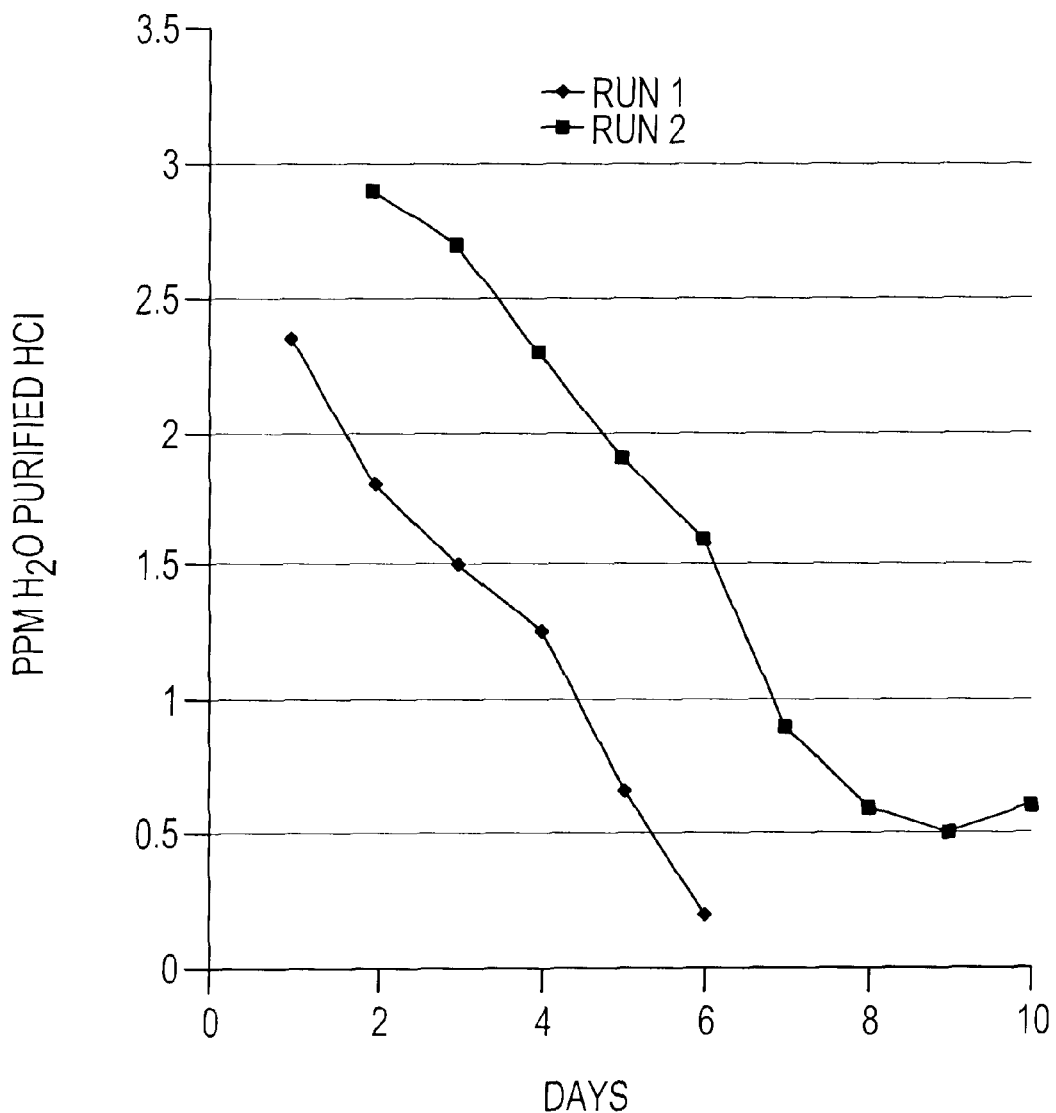

FIG. 20: Graph depicting the efficiency of water removal from hydrogen chloride gas using the low metal Tosoh mordenite zeolite produced in Example 6(D).

5. DETAILED DESCRIPTION OF THE INVENTION

The present invention is directed to a method for removing trace moisture from an acid gas, which comprises contacting the gas with a zeolite having a high silica-to-alumina ratio, wherein the zeolite has been heated to a temperature in excess of about 650° C. The term "superheated" used herein to describe the zeolites of the invention and useful in the methods of invention means that the zeolite has been heated to a temperature of about 650° C. or higher. Such heating is believed to cause dehydroxylation of the zeolite. We have discovered that superheated zeolites have the ability to effectively adsorb water from acid gases such as hydrogen chloride or hydrogen bromide to less than 0.1 ppm moisture, while avoiding the problems of dealumination associated with chlorosilylated alumina. Moreover, superheated zeolites used in the methods of the invention do not require costly, inconvenient and moisture-generating preconditioning steps with the acid gas to be purified. Thus, the present invention eliminates the problem of initial moisture generation associated with chlorosilylated aluminas and conventional zeolite purifiers.

The present invention is also directed to a method of preparing a dehydroxylated zeolite comprising heating the zeolite at a temperature of about 400° C. for a period of time sufficient to desorb a first amount of water that is physically adsorbed on the zeolite, followed by heating the zeolite to a temperature of above about 650° C. for a period of time sufficient to remove a second amount of water from the zeolite by dehydroxylation of the zeolite.

The present invention is also directed to a superheated zeolite, comprising a mordenite-type zeolite which has been heated to a temperature above about 650° C. sufficient to remove an amount of water from the zeolite by dehydroxylation, wherein the superheated zeolite has a high silica-to-alumina ratio, and a low metals content.

The present invention is also directed to a dehydroxylated zeolite, which has been heated at a temperature of about 400° C. for a period of time sufficient to desorb a first amount of water that is physically adsorbed on the zeolite, and heated to a temperature of above about 650° C. for a period of time sufficient to remove a second amount of water from the zeolite by dehydroxylation of the zeolite, wherein the zeolite has a high silica-to-alumina ratio, and a low metal content.

The present invention is also directed to a method for preparing a zeolite having a low concentration, or low level, of metallic impurities. By a zeolite having a "low concentration" or "low level" of metallic impurities, we mean a zeolite which does not emit such metallic impurities to a high-purity gas. We have found that removing impurity metals from the zeolite by contacting the zeolite with acid gas can provide a purifier zeolite material which does not emit metallic impurities into a purified gas stream. The method of preparing the low metals zeolite comprises heating the zeolite to a temperature above about 400° C. for a period of time sufficient to desorb water that is physically adsorbed on the zeolite, and contacting the zeolite with an acid gas for a period of time sufficient to reduce the metallic impurity concentration in the zeolite to less than about 70 ppm. The method optionally further comprises heating the zeolite to a temperature above about 650° C., prior to contacting it with the acid gas, for a period of time sufficient to remove a second amount of water from the zeolite by dehydroxylation of the zeolite. The method also optionally comprises the step of cooling the zeolite to a temperature less than about 300° C., preferably to ambient temperature, prior to contacting the zeolite with the gas. We have also discovered that in addition to removing impurity metals from the zeolite, the treatment with acid gas improves by at least an order of magnitude the efficiency of the zeolite in removing moisture from a gas.

The present invention is also directed to a method of removing metallic impurities from a gas, particularly from an acid gas. In addition to improving the efficiency of moisture removal from a gas, the low metals zeolite of this invention is also highly effective for removing volatile metallic impurities in a gas which have passed through a conventional gas filter. Such conventional gas filters typically will remove only particulate impurities, including particulate metallic impurities, and are incapable of removing volatile impurities. However, we have surprisingly found that the low metals zeolite of the present invention is highly effective for removing volatile metallic impurities in a gas, especially in an acid gas. The low metals zeolite may be used to remove both metallic impurities and moisture from the gas at the same time.

The method for removing metallic impurities comprises heating the zeolite to a temperature above about 400° C. and contacting said gas with the zeolite, wherein the zeolite has a silica-to-alumina ratio of above about 10 and a low level of metallic impurities. It is not necessary that the low metals zeolite be superheated in order to effectively remove such metallic impurities from the gas. However, the method may further comprise heating the zeolite to a temperature above about 650° C. prior to contacting it with said gas. The method also optionally comprises the step of cooling the zeolite to a temperature less than about 300° C., preferably to ambient temperature, prior to contacting the gas with the zeolite.

The zeolites of the present invention should have low levels of iron, titanium and magnesium. Preferably, the zeolites of the invention have less than about 20 ppm titanium, less than about 100 ppm iron, and less than about 11 ppm magnesium. In addition, it is preferred that the zeolites of the invention have less than about 1% by weight sodium as $Na_2O$.

Conventional zeolite purifiers such as mordenites used to remove moisture from acid gases are typically activated before use at temperatures ranging from 300 to 400° C. At these temperatures, practically all the physically adsorbed water is eliminated through desorption. Calcination of mordenite catalysts is usually performed at more elevated temperatures up to about 650° C. with no additional water loss. However, if mordenite is subjected to temperatures higher than about 650° C. (i.e., superheated), another portion of water is released, believed to be the result of a dehydroxylation reaction involving two hydroxyl groups of the acidic zeolite form (H-M) per one water molecule. This is the edge of the zeolite thermal stability beyond which the zeolite microporous structure collapses. However, superheated mordenite, if not left at the superheating temperature for an extended period, is fairly stable.

Mordenite with a high silica-to-alumina ratio in its acidic zeolite form (H-M) is a strong Brønsted acid. Through the dehydroxylation reaction occurring under superheating conditions, the Brønsted acid sites are converted to extremely hygroscopic Lewis acid sites, according to the equation:

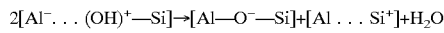

$$2[Al^- \ldots (OH)^+ - Si] \rightarrow [Al - O^- - Si] + [Al \ldots Si^+] + H_2O$$

Dehydroxylated mordenite has been known for two decades. Kuhl, G. H., 1977, "Acidity of Mordenite," MOLECULAR SIEVES-II, James R. Katzer, Ed., ACS Symposium Series 40, Chapter 9, pages 96–107. Kuhl discloses dehydroxylation of a mordenite zeolite during a temperature range of 525–880° C. in which the zeolite was heated at a rate of 5° C. per minute. However, the process of Kuhl does not address the phenomenon known as "steaming" in which the physically adsorbed water reacts with the zeolite at temperatures above 400° C. as it is desorbed, thereby chemically modifying the zeolite and rendering it less effective as a moisture absorbing material. The process for preparing a dehydroxylated zeolite of the present invention avoids the problem of steaming by maintaining the zeolite at a temperature of about 400° C. for a sufficient time to remove all the physically adsorbed water. At temperatures of about 400° C. or less, the physically desorbed water does not react with the zeolite, and the problem of steaming is avoided. Moreover, Kuhl does not teach dehydroxylated zeolites having low metals content.

We have unexpectedly found that dehydroxylated mordenite has the ability to effectively resorb water from an acid gas stream. The present invention combines the high efficiency of water removal by strong Lewis acids with the high capacity of dehydroxylated mordenite for chemical water to afford an acid resistant zeolite of superior purifying properties. It is also believed by the inventors that effective elimination of surface hydroxyl groups reduces dramatically the water forming reaction, with acid gases (e.g, HCl, HBr) at low temperatures, according to:

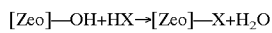

$$[Zeo] - OH + HX \rightarrow [Zeo] - X + H_2O$$

wherein X represents a halide and [Zeo] represents a zeolite.

The preferred zeolites of the invention are mordenite-type zeolites. In a preferred embodiment, the silica-to-alumina ratio of the zeolite is about 10 to about 30; particularly preferred are zeolites with silica-to-alumina ratios in the range of about 15 to about 20. Other zeolites with high silica-to-alumina ratios, in their H-form (i.e., acidic form), may also be used in the methods of the invention.

The zeolites used in the present invention may have a variety of particle sizes. For example, zeolites having particle sizes in the range of 1–10 mm may be used. In addition, the zeolites used in the invention may comprise a mixture of particle sizes, or may have a roughly uniform particle size. Preferably, the zeolites used in the invention have a uniform particle size of about 1–1.5 mm (i.e., about 1/16 inch). More preferably, the zeolite used in the invention is in the form of uniform spherical beads having a diameter of about 1–1.5 mm. Alternatively, the zeolite may be in the form of cylindrical pellets. Preferably, the cylindrical pellets have a height of about 1–1.5 mm and a cross-sectional diameter of about 1–1.5 mm. However, a mixture of particle sizes may also be used.

Examples of mordenite-type zeolites which may be used in the present invention include T-258 1 Heterogeneous Catalyst, available from United Catalysts, Inc. Louisville, Ky. and zeolite mordenite CBV 20A, manufactured by the PQ Corporation, Valley Forge, Pa., which may be purchased from Zeolyst International Products, Valley Forge, Pa. Examples of other zeolites in addition to mordenite which may be used in the methods of the invention are the high silica-to-alumnina ZSM-5 (MFI), ZSM-11 (MEL), beta (BEA), faujasite USY (FAU), hexagonal faujasite, also known as BSS (EMT), ferrierite (FER) and chabazite (CHA).

It is preferred that the zeolites of the invention have low levels of metallic impurities. In particular, it is preferred that the levels of titanium (Ti) and iron (Fe) in the zeolite are low. Preferably, the zeolite used in the methods of the present invention is a synthetic mordenite with low metals content; however, natural mordenites may also be used. A particularly preferred zeolite is low impurity metal mordenite, as described in Example 6, now available from Tosoh, Inc. in Japan ("the Tosoh zeolite"). This low metals mordenite may be purchased from Tosoh USA, 1100 Circle 75 Parkway, Suite 600, Atlanta, Ga. 30339, as supplier part no. "H-mordenite." This zeolite is a synthetic mordenite-type zeolite with a silica-to-alumina ratio of about 15, containing about 20% silica binder (final silica-to-alumina ratio is about 19). The Tosoh zeolite is particularly preferred because it has a low level of titanium impurity, i.e., less than about 20 ppm titanium. In addition, this zeolite also has very low levels of iron (less than about 100 ppm) and magnesium (less than about 11 ppm).

The total amount of water removed by dehydroxylation (i.e., "chemical water") of the Tosoh zeolite is 0.5–0.6 wt % of the zeolite. This corresponds to about 6 liters of water vapor at standard temperature and pressure ("s.t.p.") per liter of zeolite, removed by dehydroxylation. Thus, the dehydroxylated Tosoh zeolite has the capacity to reabsorb about 6 liters of additional water vapor from a gas stream, as opposed to lower-temperature activated mordenite. The total amount of physically adsorbed water, which is removed by heating the zeolite to about 400° C., is about 14 liters of water vapor (at s.t.p.) per liter of zeolite. This increases the overall water capacity as measured at atmospheric pressure (for example, by an FT-IR method) above the value of just the capacity for chemical water obtained by the rehydroxylation reaction. Therefore, about 20 lit s.t.p./lit capacity to water removal is realized with the superheated mordenite according to the present invention. However, the additional capacity due to physical water adsorption is utilized at the expense of potentially somewhat reduced purification efficiency. Thus, while the zeolite activated at conventional temperatures (ie., about 400° C.) has the capacity to physically adsorb only about 14 liters of water vapor (s.t.p.), the zeolite activated according to the methods of the invention has the capacity to absorb about 20 liters of water vapor through a combination of "chemical" and physical adsorption.

Superheating of the zeolite is performed at a temperature above about 650° C., but lower than the temperature at which the micropores of the zeolite collapse. In the case of the Tosoh zeolite, pore collapse takes place at temperatures in excess of 900° C. However, the upper limit of the heating will vary depending on the type of zeolite and its pore configuration. The zeolite may be kept at or above 650° C. for a sufficient time to dehydroxylate a sufficient amount of chemical water from the zeolite sample. Preferably, the zeolite of the invention is maintained at the elevated temperatures for approximately one hour, but not more than about 6–8 hours, to minimize structural damage that may result in lower water capacity. Preferably, the zeolite is allowed to cool to ambient temperature in the presence of moisture-free atmosphere (e.g., under Nanochem®-purified nitrogen) prior to contacting it with the gas to be purified; however, the zeolite may be used while still somewhat hot, e.g., less than about 300° C.

The methods of the present invention may be used to remove water from almost any non-basic gas; however, the invention is particularly useful for removing trace water from acid gases, including hydrogen chloride and hydrogen bromide, in particular at cylinder pressure (about 320 psi for HBr; about 620 psi for HCl), for which no other effective purifiers seem to exist. The methods of the invention are also suitable for removing moisture from a wide variety of gases used in the semiconductor industry, including halide gases such as chlorine, boron trichloride, boron trifluoride, nitrogen trifluoride, sulfur hexafluoride, silanes (especially chlorosilanes), silicon tetrachloride, silicon tetrafluoride, tungsten hexafluoride, carbon tetrafluoride, and phosphorus pentafluoride; other chemicals used in the semiconductor industry such as hydrogen fluoride; hydridic gases such as arsine ($AsH_3$), phosphine ($PH_3$) and silane ($SiH_4$); and bulk gases such as nitrogen ($N_2$), oxygen ($O_2$)s hydrogen ($H_2$), carbon dioxide ($CO_2$), argon (Ar), and helium (He).

For optimum performance, the zeolite purifier should be installed between the cylinder CGA connection and the regulator. Eliminating moisture at the source reduces corrosion, thereby protecting the entire delivery system and the process. Eliminating metallic impurities at the source also improves the performance of the entire gas delivery system and provides maximum protection of the process. Thus, for optimum performance the purifier should be able to operate at fill cylinder pressure, e.g., at 625 psig for hydrogen chloride gas and at 320 psig for hydrogen bromide gas.

In the preparation of the low metals zeolite, the zeolite must first be heated to a temperature above about 400° C. and then cooled to ambient temperature prior to contacting it with the acid gas. The zeolite must be contacted with the acid gas for period of time sufficient to reduce the concentration of metallic impurity in the zeolite to less than about 70 ppm. When the zeolite is heated to a higher temperature, for example to a temperature between about 150° C. and about 250° C., the period of time may be reduced. In addition, heating the zeolite to a temperature in the above-mentioned temperature range may result in further reduction of the metallic impurity in the zeolite.

Any acid gas may be used in the preparation of the low metals zeolite. However, the acid gas is preferably hydrogen chloride gas. Moreover, the acid gas is preferably at high pressure, i.e., at about cylinder pressure. When the acid gas is hydrogen chloride, the pressure is preferably above about 600 psi. When the acid is hydrogen bromide, the pressure is preferably above about 300 psi.

Preferably, the zeolite is allowed to cool to ambient temperature in the presence of moisture-free atmosphere (e.g. under Nanochem®-purified nitrogen) prior to contacting it with the acid gas; however, the zeolite may be used while still somewhat hot, e.g., less than about 300° C.

In the method of removing metallic impurities from a gas using the low metals zeolite, the zeolite must be activated by heating it to a temperature above about 400° C. prior to contacting it with the gas to be purified. At this temperature, practically all of the physically adsorbed water is removed from the zeolite through desorption. The activated zeolite can then be used to remove metallic impurities from a gas by contacting the gas with the zeolite. However, the low metals zeolite may additionally be superheated by heating it to a temperature above about 650° C. prior to contacting the gas to be purified with the zeolite. At this temperature, another portion of water is released, believed to be the result of dehydroxylation of the zeolite. For gases used in semiconductor manufacturing processes, it is preferred that the low metals zeolite be both activated at a temperature above about 400° C. and superheated at a temperature above about 650° C. prior to contacting it with the gas to be purified, because removal of metallic impurities and removal of moisture will often be performed simultaneously.

Preferably, the zeolite is allowed to cool to ambient temperature in the presence of moisture-free atmosphere (e.g., under Nanochem®-purified nitrogen) prior to contacting the gas to be purified with the zeolite; however, the zeolite may be used while still somewhat hot, e.g., less than about 300° C.

It is preferred that the zeolite used for removing metallic impurities have a titanium concentration of less than about 70 ppm, most preferably less than about 20 ppm; a zinc concentration of less than about 70 ppm, most preferably less than about 50 ppm; an iron concentration of less than about 100 ppm; and a combined concentration of potassium, calcium and magnesium of less than about 100 ppm.

6. EXAMPLES

Example 1

Thermogravimetric Analysis (TGA) of Zeolites

Example 1(A)

A 65.900 mg sample of zeolite manufactured by Tosoh, Japan (lot no. HSZ-640H0D, Z-951201, pellet diameter 1.5 mm, bulk density 0.58 g/ml, crush strength (hydrous) 0.22 kg/mmL, surface area (langmuir) 490 $m^2$/g, cylindrical pellets with cross sectional diameter 1–1.5 mm) was prepared by briefly purging it with nitrogen. The Thermogravimetric Analysis (TGA) was performed on a Perkin-Elmer TGA-7 thermogravimetric instrument. The sample was heated to 35° C. and held for one minute. The temperature was then increased to 400° C. at a rate of 20° C. per minute and then maintained at 400° C. for one hour during which time essentially all (about 5 mg) of the physically adsorbed water was removed from the sample. The temperature was then increased to 700° C. at a rate of 20° C. per minute and held at 700° C. for approximately one hour. During this time more water was lost, corresponding to 0.245 mg, or 0.37% by weight of the sample. When corrected for buoyancy and gas stream and density effects, the high temperature loss was about 0.35 mg (about 0.50% wt).

Altogether, 94% of the water desorbed from the sample was desorbed at 400° C. by the physical desorption process, and 6% of the desorbed water was desorbed at 700° C. by the chemical process of dehydroxylation. The TGA curve for this experiment is presented in FIG. 1.

The sample was then cooled to 200° C. at a rate of 20° C. per minute, and held at 200° C. for 30 minutes. Upon cooling to 200° C., the sample resorbed water from the surroundings by the mechanism of rehydroxylation. The sample was then cooled to 25° C. at a rate of 20 ° C. per minute. Upon cooling to ambient temperature, the sample resorbed additional water by physical readsorption. The entire experiment was repeated, with the same results. The fact that the experiment was reproducible with the same sample is a proof that the zeolite remained intact, or almost intact.

When superheated to above 900° C., the zeolite was destroyed and no water readsorption, by either rehydroxylation or physical adsorption, occurred. A subsequent TGA experiment with the sample gave a flat curve with no weight loss.

Example 1(B)

A TGA scan of a 64.7 mg sample of the Tosoh zeolite was run as follows. The sample was held for 1 minute at 25° C. The sample was then heated from 25° C. to 1200° C. at a rate of 40° C. per minute. The TGA curve is shown in FIG. 2. The TGA scan shows a main $H_2O$ desorption (weight loss) peak centered at 140° C., and a second peak centered at about 890° C.

Example 1(C)

A TGA scan of a 68.7 mg sample of a United Catalysts (UC) mordenite zeolite T-2581 heterogeneous catalyst (25–35% aluminum oxide; 65–75% mordenite; <5% nickel oxide; 30–40 lbs/cu. ft. bulk density) was run as follows. The sample was held for 1 minute at 35° C. The temperature was then increased to 800° C. at a rate of 20° C. per minute, and held at 800° C. for one hour. The sample was then cooled to 200° C. at a rate of 20° C. per minute, held at 200° C. for 30 minutes, and then cooled to 50° C. at a rate of 20° C. per minute. The TGA curve for this experiment is presented in FIG. 3. The TGA scan shows a main low-temperature water peak and two high-temperature peaks at about 580° C. and about 800° C.

Example 1(D)

A TGA scan of a 66.6 mg sample of the Tosoh zeolite was run as follows. The sample was held at 35° C. for one minute. The temperature was then increased to 800° C. at a rate of 20° C. per minute, and held at 800° C. for one hour. The sample was then cooled to 200° C. at a rate of 20° C. per minute, held at 200° C. for 30 minutes, and then cooled to 50° C. at a rate of 20° C. per minute. The TGA curve for this experiment is presented in FIG. 4. The TGA scan shows that the sample loses water in an amount of about 3.5% by weight of the sample at low temperature (peak at 130° C.), and water in an amount of about 0.3% by weight of the sample at about 800° C.

Example 1(E)

A TGA scan of a 66.6 mg sample of the Tosoh zeolite was run as follows. The sample was held at 35 ° C. for one minute. The temperature was then increased to 400° C. at a rate of 20° C. per minute, and held at 400° C. for one hour. The temperature was then increased to 800° C. at a rate of 20° C. per minute. The sample was then cooled to 200° C. at a rate of 20° C. per minute and held at 200° C. for 30 minutes, followed by cooling to 25° C. at a rate of 20° C. per minute. The TGA curve for this experiment is presented in FIG. 5. The TGA scan shows low and high temperature water peaks.

Example 1(F)

A TGA scan of a 119.3 mg sample of a United Catalysts (UC) mordenite zeolite T-2581 (as in Example 1(C)) was run as follows. The sample was held at 35° C. for one minute. The temperature was then increased to 400° C. at a rate of 20° C. per minute, and held at 400° C. for one hour. The temperature was then further increased to 700° C. at a rate of 20° C. per minute, and held at 700° C. for one hour. The sample was then cooled to 200° C. at a rate of 20° C. per minute, held at 200° C. for 30 minutes, and then further cooled to 25 ° C. at a rate of 20° C. per minute. The TGA curve for this example is presented in FIG. 6. The TGA scan shows that there is more water loss at high temperature, i.e. about 1.3% of dehydrated sample.

Example 1(G)

A TGA scan of a 245.4 mg sample of United Catalysts (UC) mordenite zeolite T-2581 (as in Example 1(C)) was run as follows. The sample was held at 35° C. for one minute. The temperature was then increased to 350° C. at a rate of 20° C. per minute, and held at 350° C. for one hour. The temperature was then further increased to 700° C. at a rate of 20° C. per minute, and held at 700° C. for one hour. The sample was cooled to 200° C. at a rate of 20° C. per minute, and held at 200° C. for 30 minutes, followed by further cooling to 25° C. at a rate of 20° C. per minute. The TGA curve for this experiment is presented in FIG. 7.

Example 1(H)

A repeat TGA scan of the 245.4 mg sample of United Catalysts (UC) mordenite zeolite of Example 1(G) was run after rehydration of the sample at ambient conditions (about 5% humidity). The TGA scan was run as described in Example 1(G). The TGA curve for this experiment is presented in FIG. 8. The TGA scan shows that the high temperature water desorbed is significantly less.

Example 1(I)

A TGA scan of a 392.2 mg sample of the Tosoh zeolite was run as follows. The sample was held at 35° C. for one minute. The temperature was then increased to 400° C. at a rate of 20° C. per minute, and held at 400° C. for 240 minutes. The temperature was then further increased to 700° C. at a rate of 20° C. per minute, and held at 700° C. for one hour. The sample was then cooled to 200° C. at a rate of 20° C. per minute, held at 200° C. for 30 minutes, and then further cooled to 25° C. at a rate of 20° C. per minute. The TGA scan for this experiment is presented in FIG. 9.

Example 1(J)

A TGA scan of a 69.0 mg sample of PQ Corporation mordenite zeolite (Zeolyst International Product No. CBV 20A, silica-to-alumina ratio: 20; nominal cation form: ammonium; 0.08% (wt) $Na_2O$; 500 $m^2$/g surface area) was run as follows. The sample was held at 35° C. for one minute. The temperature was then increased to 400° C. at a rate of 20° C. per minute, and held at 400° C. for one hour. The temperature was then further increased to 700° C. at a rate of 2° C. per minute, and held at 700° C. for one hour. The sample was then cooled to 200° C. at a rate of 20° C. per minute, held at 200° C. for 30 minutes, and then further cooled to 50° C. at a rate of 20° C. per minute. The TGA curve for this experiment is presented in FIG. 10. The TGA scan shows that about 15% of weight loss occurs during the second temperature ramping. Using the same sample, the TGA scan was repeated using the same conditions. The repeat TGA scan for the sample is presented in FIG. 11, which shows that the weight loss at high temperature is about one-third of what it was before. The TGA scan was repeated three more times under the same conditions. The TGA curves for these repeated TGA scans are presented in FIGS. 12, 13 and 14 respectively, which show essentially the same results. These TGA scans demonstrate that reproducibility of water removal from calcined-rehydrated mordenite is excellent. About one-half percent weight loss occurs above 400° C. (about 5% of entire weight loss).

Example 1(K)

A TGA scan of a 46.1 mg sample of PQ Corporation Beta-Type zeolite (BEA) (Zeolyst International Product No. CP814-B, silica-to-alumina ratio: 20; nominal cation form: ammonium; 0.05% (wt) $Na_2O$; 680 $m^2$/g surface area) was run using the same temperature program described in Example 1(J). The TGA curve for this experiment is presented in FIG. 15. The TGA scan shows 5.2 mg weight loss during the first ramping (11% by weight of the sample), and 0.3 mg weight loss during the second ramping (0.5% by weight of the sample).

Example 1(L)

A TGA scan of a sample of PQ Corporation Type Y zeolite (FAU) (Zeolyst International Product No. CBV712; silica-to-alumina mole ratio: 12; nominal cation form: ammonium; 0.05% (wt) $Na_2O$; 24.35 A unit cell size; 730 $m^2$/g surface area) was run using the temperature program described in Example 1(J). The TGA curve for this experiment is presented in FIG. 16. The TGA scan shows that about 0.5% of the weight loss occurs during the second ramping, and that the PQ Type Y zeolite has essentially similar behavior to mordenite.

Example 1(M)

A TGA scan of a 73.8 mg sample of PQ Corporation ZSM-5 Type zeolite (Zeolyst International Product No. CBV 3024; silica-to alumina mole ratio: 30; nominal cation form: ammonium; 0.05% (wt) $Na_2O$; 375 $m^2$/g surface area) was run using the same temperature program described in Example 1(J). The TGA curve for this experiment is presented in FIG. 17. The TGA scan shows about 5.0 mg weight loss during the first ramping (about 6.5% by weight of the sample) and about 0.3 mg weight loss during the second ramping (0.4% by weight of the sample).

Example 2

Preparation of Superheated Zeolite by Activation of Tosoh Mordenite at the 1L Scale Example 2(A)

637.3 grams (about 1.05 liter) of freshly sieved Tosoh mordenite (between 8 and 25 mesh) were charged into a quartz reactor tube (2 inch internal diameter).

The reactor was equipped with a quartz frit to maintain the solid pellets in the downstream direction. A hole in the middle of the frit allowed the introduction of a thermocouple into the reactor (upstream), such that the tip of the thermocouple was placed at about the middle of the zeolite bed. On the other end of the reactor, a Pyrex glass container was attached to the reactor mouth through a wide-mouth glass joint. Prior to and during the activation (heating) run, the container was constantly heated by an external heating tape to about 130° C., to eliminate moisture from the glass. During the activation run, the reactor-container was purged continuously with dry cylinder or house nitrogen which had been passed through a Nanochem® purifier to further reduce the moisture level from about 1 ppm to about 100 ppt or less. The nitrogen purge gas was flowed into the system through a side arm, equipped with a valve, attached to the upstream part of the reactor near the reactor wide mouth. At the downstream end, a side tubing allowed the nitrogen gas to pass either through a second Nanochem® purifier (to prevent moisture from reentering the reactor during the cooling stage) or through a bypass line, then through a rotameter (1–5 liter per minute range) to vent. The purge flow was kept at 1–2, usually about 1.5 liter per minute. Initially, during heating, the nitrogen was flowed to vent through the bypass line. The reactor was placed inside a tubular horizontal Lindberg high-temperature (0–1200° C.) furnace.

Heating of the reactor was started by setting the temperature control to gain a bed temperature over 200° C.; sufficient time was allowed to have the inside temperature and the outside temperature (measured by a second thermocouple placed between the reactor tube and the furnace ceramic material) to become practically the same, or very close. When the outside temperature was 249° C. and the inside temperature was 223° C., water was observed to condense on the reactor cold outlet. A heat-gun was used to eliminate the droplets formed by evaporating them into the gas stream. The temperature was then increased to 280° C. (inside and outside) and more condensing water was observed; however, these droplets in the reactor outlet section eventually disappeared. The flow was then 1.0 liter per minute. Heating was continued to a temperature of 400° C., then to 445° C. (inside). At this stage the flow of nitrogen was increased to 2 liter per minute to assist fast removal of moisture generated in the reactor outlet because of the extensive dehydration of the zeolite. Subsequently, over a period of about two hours, the temperature was raised to about 740° C. After about 30 minutes at 740° C., heating was stopped. The flow of nitrogen was diverted from the bypass to the second Nanochem® purifier (by closing the free line and opening the valve to the purifier), and continued overnight while the system slowly cooled back to room temperature. The glass container continued to be heated.

After cooling overnight, the heating tape was removed from the container and the reactor-container unit was disengaged from the gas lines while still held closed to the outside atmosphere, and the purifiers were shut off. Taken carefully out from the furnace, the reactor-container was tilted to a vertical position to transfer the zeolite into the container. The reactor-container was then transferred into a closed plastic sleeve purged with Nanochem®-purified nitrogen. A stopcock fitting the container wide mouth, which had been left in the oven at 110° C. for 24 hours, was added to the plastic sleeve. The dry nitrogen purge of the plastic sleeve was made sufficient to slightly inflate the sleeve. After 2½ hours in the plastic sleeve, the container was detached from the reactor (inside the sleeve) and closed instantly with the stopcock. The nitrogen purge was stopped and the container (now separated from the reactor) was transferred to a glovebox under Nanochem® pure nitrogen atmosphere. In the glovebox, the content of the Pyrex container was transferred to a 1,000 ml polypropylene jar which had been kept previously at least overnight inside the glove box, to remove moisture from the plastic material. The Pyrex container was then returned to the reactor setup for the next batch of product.

Example 2(B)

The preparation of Example 2 was repeated, except that 620 grams of the Tosoh zeolite were processed this time, and superheating was carried out at 700° C. for 105 minutes.

Example 2(C)

Another 1 liter batch of the purifier was made, but with 650 grams (~1.1 liter) taken from another drum of the raw material, freshly opened, which did not require sieving since it contained no visually detectable dust/powder. The activation of the zeolite under superheating conditions was performed at 705° C. for 120 minutes.

Example 2(D)

This is a reference experiment of making a purifier by thermal activation but without superheating. Except for the superheating, this experiment followed closely the procedure of Example 2(A). 635 grams of the Tosoh zeolite from the same drum as used in Example 3, were charged into the reactor. Heating was performed to 415 ° C. for a period of 7 hours.

Example 3

Measurement of Moisture Capacity of Superheated Zeolite Using FT-IR

The moisture capacity of a sample of the super-heated zeolite, which had been prepared as described in Example 2(A) above, was measured using a Fourier Transform Infra Red (FT-IR) spectroscopy method described by D. E. Pivonka, 1991, APPLIED SPECTROSCOPY, vol. 45, number 4, pp. 597–603.

The instrument used was a Nicolet Magna 760 FT-IR spectrometer equipped with an MCT (mercury cadmium tellurium alloy) detector. As described by Pivonka, the spectrometer was equipped with a 10 cm stainless steel cell in the auxiliary sample compartment for measurement of the water concentration at the inlet of the purifier, and a 10 m nickel-plated stainless steel cell for measurement of the water concentration downstream of the purifier. The water concentration of the inlet gas stream to the purifier, which is referred to herein as the "moisture challenge," was in the hundreds to thousands ppm range. The water concentration of the gas downstream of the purifier prior to breakthrough is typically in the range of 100 ppb–10 ppm. The spectrometer was enclosed in a plastic box dried under a constant Nanochem®-purified nitrogen purge of 20 liter per minute.

The "moisture challenge" gas stream having a constant concentration of about 400–500 ppm was generated as follows. Nitrogen was passed over a water diffusion vial held in a stainless steel autoclave at a constant temperature of 80° C., generating a moisture-containing nitrogen gas stream. The moisture-containing nitrogen gas stream was diluted with a stream of dry matrix gas (i.e., $N_2$, HCl, or HBr), resulting in the "moisture challenge" gas stream. The accurate concentration of water in the moisture challenge gas stream was calculated based on the gas flow (through a calibrated mass-flow controller) and measuring the amount of water in the diffusion vial before and after the experiment. The purifier unit consisted of an L-60 container having 60 ml of purifier material in a tubular 20 cm height bed. The "moisture challenge" gas stream was introduced into the purifier unit at a flow rate of 2000 cc(STP)/min, under pressure of 13.4 psia. The temperature of both the 10 cm and 10 m FT-IR cells was maintained at 110° C., and the MCT detector was held at –190° C.

The FTIR measurement was based on the change in the water absorbance line at 3853 cm$^{-1}$. Continuous automatic and programmed operation of the FTIR was done by employing an OMNIC™ software. The run was continued until a breakthrough occurred, meaning a sudden and drastic increase in water level downstream of the purifier. The breakthrough point was defined and calculated as the cross-section of the baseline representing moisture removal to the full efficiency of the purifier (usually, below the FTIR detection limit, i.e., about 100 ppb) and the tangent of the breakthrough line showing a gradual increase in water level (as higher intensity absorbance). The transformation of the collected data and the breakthrough point into capacity terms as liter moisture (gas phase) per liter purifier, was done by straightforward arithmetic calculations. Results of the FTIR capacity test for the superheated mordenite purifier, with HCl, HBr and $N_2$ matrix gases, are listed in Table 1.

The capacity under nitrogen is the lowest, but still very high and about 50% higher than the capacity of a chlorosilylated alumina as measured under identical conditions (11 L/L). Under HBr, a 'record' capacity has been measured which is 35% higher than the capacity under nitrogen. It could be that the acid gas 'conditions' the zeolite thereby creating more sites for water removal, perhaps by chemisorption or a chemical reaction. One possibility is the generation of chloro- and bromosilyl or aluminyl groups on the zeolite surface by a partial reaction of the zeolite with HCl and HBr, respectively, ≡Si—O—T≡+HX→≡Si—OH+≡T—X

≡T—X+H$_2$O→≡T—OH+HX

T being a tetrahedral framework element (either Si or Al) and X being halide element (Cl, Br).

Example 4

Measurement of Moisture Capacity of Superheated Zeolite Using Ametek 2850 Moisture Analyzer In this Example, we describe moisture capacity measurement of purifiers using an Ametek 2850 moisture analyzer. This analyzer allows the measurement of moisture in the range of 0.1–1000 ppm, under a gas pressure in the range of 15–75 psig. The purifier unit was challenged with 400–450 ppm moisture in nitrogen, generated as described in Example 3 by diluting a nitrogen stream passed through an autoclave containing a diffusion vial (to provide a moisture level of 8000–9000 ppm) with a dry nitrogen stream, at a ratio of 1-to-9, respectively. The combined gas stream was flowed through the purifier at a rate of 2000 cc(STP)/min, at a pressure of 29.7 psia. A 'breakthrough' behavior was obtained as in the FTIR measurement described in Example 3, but the breakthrough point in the present example was defined and calculated as the point of 1 ppm moisture on the breakthrough curve. This point was very close to the breakthrough point as defined in the FTIR measurement described in Example 3 (within 5% or so). The moisture analysis was done using a computer program transferable to Microsoft Excel®. The transformation of the collected data and the breakthrough point into capacity terms, as liter moisture (gas phase) per liter purifier, was done by straightforward arithmetic calculations. The results are shown in Table 1.

According to Table 1, the Ametek results are substantially higher than the FTIR results and this could be attributed to the pressure difference. A single experiment at 74.7 psia seemed to confirm that the effect of pressure on the adsorption of water onto the purifier is considerable. This effect is demonstrated in FIG. 18. Thus, using high pressure matrix gas may increase the purifier capacity for water dramatically. Comparing the different batches of the superheated mordenite purifier under the same pressure (29.7 psia) shows consistent capacity data of about 30 L/L. In contrast, a purifier made by activation at 415° C. exhibits a much lower capacity. The effect of the superheating, according to the Ametek capacity measurement, is a capacity increase of about 30%.

Example 5

Calculation of Moisture Capacity of Superheated Tosoh Mordenite Using Results of Thermogravimetric Analysis (TGA)

Here we calculate the effect of the superheating of Tosoh mordenite on the moisture capacity as measured with nitrogen matrix gas, based on the TGA results. As shown, there is excellent agreement between the prediction made based on the TGA work and the actual effect as obtained with the 1 L batch samples.

As listed in Table 1, one sample of the superheated zeolite had a capacity of 17 L/L (under atmospheric pressure). A typical TGA experiment, as described in Example 1(A), and depicted in FIG. 1, gives the following results: At 400° C., there is 5.9% water loss; between 400 and 700° C., there is additional loss of 0.38% which after correction for buoyancy and flow effects (by subtracting the blank curve of empty TGA pan) becomes 0.50%. The original weight of the partly hydrated mordenite zeolite was 65.90 mg. Therefore, 3.89 mg moisture was lost up to 400° C., and additional 0.33 mg up to 700° C.; the superheated sample weighed 61.68 mg.

As shown in Table 1, the capacity of one sample of the superheated zeolite was 17 liters of water vapor per liter of superheated zeolite. 17 L of water vapor corresponds to 13.66 grams of water; and one liter of superheated zeolite weighs 600 grams. Thus, 600 grams of the superheated zeolite (1L) has the capacity to absorb 13.66 grams of water. Therefore, the capacity value corresponds to $(13.66/600) \times 100 = 2.277\%$ by weight. This is the resorbed water by both chemical ('rehydroxylation') and physical adsorption. Thus, the total resorbed water up to the capacity breakthrough point, in the case of the above sample, is $(61.68 \times 2.277)/100 = 1.404$ mg. Since the 'dehydroxylation' water amount is 0.33 mg and it is reasonable to assume that all of that water will resorb, the 'leftover' water for physical adsorption is $1.404-0.33 = 1.074$ mg (27.6% of the desorbed water up to 400° C.).

We can now calculate the capacity of the zeolite activated at 400° C., based on the TGA. 1.074 mg water physically resorbed over $(61.68+0.33) = 62.01$ mg dry zeolite activated at 400° C. Since 1.074 mg water is 1.3365 ml of standard gas phase $H_2O$, and since 62.01 mg zeolite purifier activated at about 400° C. is 0.10335 ml volume, the capacity is $1.3365/0.10335 = 12.9$ L/L. The increased capacity due to 'dehydroxylation' is $(17-12.9)/12.9 = 0.315$ (or 31.5%), in perfect accord with the above large-scale direct results.

TABLE 1

Moisture Capacity of Superheated Zeolites

| Activation Temperature (° C.)/Time(min) | Matrix Gas | Pressure (psia) | Analyzer | Moisture Capacity (L/L) |
|---|---|---|---|---|
| 740/30 | HCl | 13.4 | FTIR | 20 |
| (Example 2A) | HBr | 13.4 | FTIR | 23 |
| | $N_2$ | 13.4 | FTIR | 17 |
| | $N_2$ | 29.7 | Ametek | 27 |
| 700/105 | $N_2$ | 29.7 | Ametek | 31 |
| (Example 2B) | | | | |
| 705/120 | $N_2$ | 29.7 | Ametek | 29 |
| (Example 2C) | $N_2$ | 74.7 | Ametek | 52 |
| 415/420 | $N_2$ | 29.7 | Ametek | 23 |
| (Example 2D) | | | | |

Example 6

Preparation of Low Impurity Metal Zeolite

Example 6(A)

We have found that a zeolite purifier based on an AW-300 natural mordenite from UOP (Linde) emitted metals such as zinc, magnesium, calcium, iron and aluminum upon being subjected to hydrogen chloride streams. We have further found that a synthetic mordenite from PQ Corporation contained 2700 ppm titanium, and in purifying hydrogen chloride used for wafer polishing, it had caused "haze" and "spikes" attributed to titanium impurities in the gas. Analysis of the purified hydrogen chloride revealed $700 \times 10^6$ titanium atoms per $cm^3$, whereas other metals were found at concentrations of only $10 \times 10^{16}$ to $20 \times 10^{16}$ atoms per $cm^3$ and were believed not to contribute to the haze and spikes formation. Therefore, it was estimated that reducing the titanium contamination in the zeolite by a factor of about 100 would yield a product suitable for hydrogen chloride purification without titanium emission, under conditions used in microelectronic processing.

Table 2 presents the metal contamination levels in mordenite zeolites from various sources, all having silica-to-alumina ratios in the range of between about 15 and about 20. The zeolite from PQ Corp., CP-511–13, is a synthetic mordenite having a silica binder. The Tosoh zeolite, HSZ-620-HOD, is a synthetic mordenite having a clay binder. The Linde/UOP zeolite, AW-300, is a natural mordenite having an unknown binder. The source and binder of the Norton zeolite, Zeolon 900, is unknown. The metal contamination levels in the PQ, Tosoh and Linde/UOP mordenites were determined by x-ray fluorescence using Applied Research Labs, Model 8410 Wavelength Dispersive X-Ray Fluorescence Spectrometer. The metal contamination levels for the Norton mordenite were obtained from literature. These mordenites vary in titanium contamination levels with the Norton and PQ zeolites exhibiting the highest levels. The mordenite from Tosoh contained the least contamination of titanium, 220 ppm, which is still considered higher than desired by about one order of magnitude.

TABLE 2

Metal Contamination Levels in Mordenites from Suppliers

CONTAMINATION LEVEL (ppm)

| | H-Mordenite | | | Na-Mordenite |
|---|---|---|---|---|
| ELEMENT | PQ Corp. CP-511-13 | Tosoh HSZ-620-HOD | Linde/UOP AW-300 | Norton Zeolon 900 |
| Al | 41,000 | 57,000 | 57,000 | 44,000–58,000 |
| Si | 425,000 | 403,000 | 355,000 | 349,000–379,000 |
| Na | 1800 | 7000 | 7100 | 37,100–63,100* |
| Mg | 170 | 3600 | 18,000 | |
| K | 300 | 650 | 27,000 | <4300 |
| Ca | 130 | 1600 | 25,000 | <4200 |
| Fe | 1000 | 6100 | 10,000 | 3500–7000 |
| Zn | 2700 | 220 | 900 | |
| Ti | 2700 | 220 | 900 | <3600 |
| F | | | 3300 | |
| V | | | 30 | |
| Cr | | 180 | | |
| Mn | | | 720 | |
| Rb | | | 270 | |
| Sr | | 50 | | |
| Zr | 100 | 80 | 160 | |
| Nb | | | 50 | |
| Ce | | | 60 | |
| NW | | | 50 | |

*Norton reports Na content of H-Zeolite as <3500 ppm.

Table 3 presents the metal contamination levels in components of the final zeolite product from PQ Corporation, including the crystalline zeolite powder as synthesized, the silica sol and the silica gel used by PQ in the manufacture of the zeolite, as well as three different batches of the final extrudate having about 20% silica binder. The metal contamination levels were again determined by x-ray fluorescence. It is apparent from Table 3 that the main source of titanium contamination is the zeolite powder, and that no contamination is contributed to the zeolite from the silica binder or the extruder. Indeed, the titanium level in the final extrudate reflects the ratio of pure zeolite powder to silica binder (80:20) in the final extrudate. Therefore, based on Table 3, it was concluded that while silica binder should be used to reduce titanium levels arising from the other binders such as clay or alumina, a cleaner zeolite is needed to achieve acceptable titanium levels in the two-digit ppm range.

TABLE 3

Metal Contamination Levels in Raw Materials and Extrudate for PQ Corp. CP-511-13 Zeolite

| | Contamination Level (ppm) | | | | | |
|---|---|---|---|---|---|---|
| Element | Mordenite Powder | Silica Gel | Silica Sol | Mordenite Ektrudate | | |
| | | | | Batch 1 | Batch 2 | Batch 3 |
| Al | 43,000 | | | 44,000 | 43,000 | 41,000 |
| Si | 417,000 | 466,000 | 128,000 | 424,000 | 425,000 | 425,060 |
| Na | 2200 | 70 | | 1800 | 1900 | 1800 |
| Mg | 100 | 80 | | 90 | 80 | 170 |
| K | 170 | | | 140 | 160 | 300 |
| Ca | | 150 | | 100 | 100 | 130 |
| Fe | 660 | 40 | 800 | 1000 | 1000 | |
| Ti | 3400 | 120 | | 2200 | 2200 | 2700 |
| S | 60 | | 2300 | 150 | 180 | |
| P | | | 240 | | | 600 |
| Cl | | | 70 | | | 230 |
| Cr | 40 | 40 | | 110 | 120 | 180 |
| Zr | 120 | | | 80 | 80 | 100 |

Example 6(B)

This example demonstrates the effect of several cleaning methods on a mordenite zeolite from Tosoh, made with a silica binder instead of a clay binder. The metal contaminant levels in the Tosoh zeolite, after activation at about 400° C., were initially measured, and these values are presented in Table 4. Replacement of the clay binder with a silica binder reduced the titanium level from 220 ppm to 90 ppm.

The first cleaning method used was treatment with aqueous hydrogen chloride (1 g zeolite in 4% HCl) and alcoholic hydrogen chloride (10 g zeolite and 5% HCl in isopropyl alcohol and ethylene glycol). This treatment method removed only marginal metal contaminant amounts (about 0.5%).

The second cleaning method used was extraction with aqueous hydrogen chloride (about 5%) and aqueous 1.1% $Na_2H_2$-EDTA, a well-known chelating agent for transition metals. This extraction also did not result in a great difference in metal contaminant concentration, as shown by the results in Table 4.

Finally, the zeolite was treated with high pressure hydrogen chloride gas. This treatment resulted in a substantial reduction in titanium levels, as shown in Table 4.

TABLE 4

Metal Impurities in Tosoh Mordenite with Silica Binder

| | Impurity Level (ppm) | | |
|---|---|---|---|
| Impurity | After activation at about 400° C. | After aq. HCl & EDTA extractions | After high pressure HCl gas treatment |
| Ti | 90 | 82–86 | 62 |
| Ca | 70 | 55–77 | 82 |
| Mg | 90 | 58–86 | 77 |
| Zn | 6 | about 2–3 | 4 |
| Ni | 83 | 65–71 | 71 |
| Cr | 70 | 48–51 | 49 |
| Cu | 2 | about 3 | 3 |
| Fe | 320 | 280–290 | 250 |
| Li | 44 | 32–68 | 110 |

Example 6(C)

This example demonstrates the removal of titanium from the Tosoh mordenite having 20% silica binder. The Tosoh mordenite initially contained 90 ppm, after its activation at about 400° C. The experimental setup consisted of a 500 milliliter bed containing the mordenite and through which a gas was passed. The gas exiting the mordenite bed was then passed through a series of traps containing deionized water (Traps A and B) or optionally other liquids (Trap C). All of the gas, including any metals emitted from the mordenite to the gas, were absorbed into the trap medium. The concentration of various metals in the trap medium was then measured using ICP-AES (Inductively Coupled Plasma—Atomic Emission Spectrometry) with ultrasonic nebulizer, according to the procedure described by Fosdick, L. E. and P. M. Bhadha, *Analysis of HCl Gas After Treatment with Dryer Resin for Trace Elemental Contaminants with ICP-AES with Ultrasonic Nebulization*, 21ST CONFERENCE OF THE FEDERATION OF ANALYTICAL CHEMISTRY AND SPECTROSCOPY SOCIETIES (Oct. 2–7, 1994, St. Louis, Mo.).

Initially, nitrogen gas at low pressure (30–50 psi) and low flow rate (0.5 liters per minute) was passed directly through Traps A and B, bypassing the mordenite bed, to measure a baseline of metal levels in the system. The concentration of various metals in each trap after each run was measured, and the results are presented in Table 5a.

Next, nitrogen gas at high pressure (650 psi) and low flow rate (0.5 liters per minute) was passed through the mordenite bed, and the emissions were again captured in a series of water traps. The concentration of metals in each trap after each run is presented in Table 5b. This high pressure/low flow nitrogen test resulted in practically no metal removal from the mordenite to the traps.

Third, hydrogen chloride gas at high pressure (625 psi) and low flow rate (0.5 liters per minute) was passed over the mordenite bed, and the exiting hydrogen chloride gas was then passed through Traps A and B to capture the metal emissions in the gas. In some runs, the hydrogen chloride gas was also passed through a third Trap C containing tetrabutylammonium hydroxide to capture silicon. The concentration of metals in each trap after each run was measured, and the results are presented in Table 5c.

The emissions of metals in the hydrogen chloride gas as it exited the mordenite bed were then calculated based on the concentration of the emitted metal found in the traps, the total volume of gas, and the trap weight increase. These calculated emission levels in the hydrogen chloride gas are presented in Table 5d. These results show that replacement of the nitrogen with high pressure hydrogen chloride gas caused relatively large amounts of metals to be detected as emissions into the gas stream. The initial emissions of titanium, aluminum, silicon, calcium and iron ranged from 107 ppb to 299 ppb. In run number 25, after passing a total of 486 liters of hydrogen chloride over the zeolite, the silicon and calcium emissions were reduced remarkably, to 62 ppb and 14 ppb respectively, but the titanium, aluminum and iron emissions remained about the same.

Finally, hydrogen chloride gas at high pressure (625 psi) and high flow rate (10 liters per minute) was passed over the mordenite bed, and a slip stream of the exiting hydrogen chloride (0.5 liter per minute) was then passed through Traps A and B to capture the metal emissions in the gas. In some runs, the hydrogen chloride gas slip stream was also passed through a third Trap C containing tetrabutylammonium hydroxide to capture silicon. The concentration of metals in each trap after each run was measured, and the results are presented in Table 5e.

The emissions of metals in the hydrogen chloride gas as it exited the mordenite bed were then calculated based on the concentration of the emitted metal found in the traps, the total volume of gas, and the trap weight increase. These calculated emission levels in the hydrogen chloride gas are presented in Table 5f. By run number 29, after 685 liters of hydrogen chloride were passed over the zeolite, the iron level dropped to 92 ppb, the aluminum level dropped to 37 ppb, and the titanium level dropped to 55 ppb. By run number 31, after a total hydrogen chloride volume of 767 liters, the titanium level was reduced to 22 ppb. The zeolite was under hydrogen chloride flow for about 25 hours, and the titanium level in the zeolite was reduced to about 70 ppm. By run number 35, the purified hydrogen chloride gas was free of all metallic emissions.

Example 6(D)

In this example, a "confirmation run" under high pressure hydrogen chloride gas is described. The same experimental setup as in Example 6(C) was used in this example. Traps A and B contained deionized water, and Trap C contained tetrabutyl-ammnonium hydroxide to trap silicon. All traps were chilled with an ice-water bath. First, high pressure nitrogen gas (650 psi) at high flow rate (10 liters per minute) was passed through the mordenite bed, and the emissions were captured in Traps A and B. The concentration of metals in each trap after each run is presented in Table 6a.

Next, hydrogen chloride gas at high pressure (625 psi) and high flow rate (10 liters per minute) was passed over the mordenite bed, and a slip stream of the exiting hydrogen chloride (0.5 liter per minute) was then passed through Traps A and B to capture the metal emissions in the gas. In some runs, the hydrogen chloride gas slip stream was also passed through a third Trap C containing tetrabutylammonium hydroxide to capture silicon. The concentration of metals in each trap after each run was measured, and the results are presented in Table 6b.

The emissions of metals in the hydrogen chloride gas as it exited the mordenite bed were again calculated based on the concentration of the emitted metal found in the traps, the total volume of gas (from the total time on stream) and the trap weight increase. These calculated emission levels are presented in Table 6c. The "Total Time on Stream w/HCl" is the cumulative number of hours the hydrogen chloride gas was flowing over the zeolite. The "Total Time of Exposure to HCl" is the cumulative number of hours the zeolite was exposed to high pressure hydrogen chloride gas, including the time when the gas flow was stopped between runs. After a cumulative exposure time of about 150 hours (at run number 20), the titanium level in the gas dropped from 172 ppb to 13 ppb. The initial silicon level of 362 ppb decreased to 56 ppb within about 33 hours of exposure (at run number 11).

FIG. 19 depicts the titanium emission into the hydrogen chloride gas as a function of hours and days on stream. The reduction in titanium emission is clearly seen to become effective after at least 3–4 days of the hydrogen chloride treatment of the zeolite.

Upon completion of this experiment, the titanium level in the zeolite had been reduced to about 70 ppm.

Example 6(E)

Example 6(D) was repeated with a fresh sample of zeolite. However, in this example the zeolite bed and the hydrogen chloride gas passing through the bed was heated to a temperature of about 150° C. After a total exposure time of about two weeks, the titanium level in the zeolite was reduced to about 16–17 ppm.

This high-temperature treatment was repeated with another fresh sample of zeolite, except that the temperature of the zeolite bed and hydrogen chloride gas was raised to about 250° C. After a total exposure time of about one week, the titanium level in the zeolite was reduced to about 16–17 ppm.

This example demonstrates that while room temperature conditioning reduced the titanium level in the zeolite from 90 ppm to about 70 ppm, high temperature treatment of the zeolite further reduced the titanium level to about 16–17 ppm. This example also demonstrates that increasing the treatment temperature from 150° C. to 250° C. reduces that total exposure time necessary to achieve a low level of titanium in the zeolite. We believe that room temperature treatment with hydrogen chloride gas was sufficient to strip titanium from the outer surface of the zeolite, whereas high temperature treatment extracted titanium from throughout the zeolite.

Example 6(F)

This example demonstrates the efficiency of the low metals mordenite produced in Example 6(D), after activation at about 400° C., for the removal of moisture from hydrogen chloride gas under the same gas flow conditions. Two efficiency tests were run on an on-line Nicolet Model 740 FTIR spectrometer with hydrogen chloride gas containing a challenge of 500–1000 ppm moisture (as volume of water vapor per volume hydrogen chloride). Nitrogen with 600–1500 ppm moisture challenge was used for calibration, with a Meeco Aquamatic Plus moisture analyzer for the FTIR outlet and Meeco NEP-BRAVO instrument for the inlet.

As shown in FIG. 20, the efficiency of moisture removal from the hydrogen chloride gas gradually improved. After 6–10 days, the improvement was by an order of magnitude: an efficiency of a few tenths of ppm compared to a few ppm units. This behavior is parallel to the removal of the titanium impurities from the zeolite suggesting that the prolonged treatment of the zeolite with hydrogen chloride resulting in the elimination of emitted titanium is also beneficial for the moisture removal efficiency of the zeolite.

Thus, it is shown by this Example 6, that a search for a low titanium zeolite for corrosive gas purification has resulted in the identification of a 90-ppm-titanium mordenite starting zeolite whose titanium level could be further reduced to at least about 70 ppm, resulting in a product not emitting titanium into hydrogen chloride streams while also enabling an order of magnitude better efficiency of moisture removal from hydrogen chloride.

TABLE 5a

Emission Analysis of Tosoh Mordenite (90 ppm Ti)
Nitrogen Line Blanks Using Low Pressure $N_2$ (30–50 psi) at Low Flow (0.51 pm)

| | | | | | | | Analysis of Traps (ppb, nanogms/ml) | | | | | | | |
|---|---|---|---|---|---|---|---|---|---|---|---|---|---|---|
| Run No. | Total Gas Vol. (liters) | Trap | $LLD^1$ $LLQ^1$ | Ti 0.8–3 3–10 | Al 0.5–2 2–7 | Si 3–5 10–20 | Ca 0.1 0.4 | Mg 0.1–0.2 0.4–0.8 | Zn 0.3–0.9 1–3 | Ni 2–7 8–20 | Cr 3–5 10–20 | Cu 1–5 4–14 | Fe 0.9–3 3–10 | Li 2 5–6 | Na 4–10 10–50 |
| 1 | 30 | A | | <1 | <0.7 | <10 | 8 | <0.8 | <0.4 | <5 | <3 | <2 | <2 | <2 | <4 |
| | | B | | <4 | 5 | 40 | 142 | 19 | 10 | <5 | <3 | <2 | <5 | <2 | 57 |
| 2 | 30 | A | | <1 | <2 | <10 | 18 | 1 | 3 | <5 | <3 | <2 | <2 | <2 | <13 |
| | | B | | <1 | <0.7 | <3 | 4 | <0.8 | <0.4 | <5 | <3 | <2 | <2 | <2 | <4 |
| 3 | 45 | A | | <1 | <2 | <3 | 23 | 2 | 4 | <5 | <3 | <2 | <2 | <2 | 19 |
| | | B | | <1 | <0.7 | <3 | 9 | <0.8 | 2 | <5 | <3 | <2 | <2 | <2 | <13 |

TABLE 5a-continued

Emission Analysis of Tosoh Mordenite (90 ppm Ti)
Nitrogen Line Blanks Using Low Pressure $N_2$ (30–50 psi) at Low Flow (0.51 pm)

Analysis of Traps (ppb, nanogms/ml)

| Run No. | Total Gas Vol. (liters) | Trap | LLD[1] LLQ[1] | Ti 0.8–3 3–10 | Al 0.5–2 2–7 | Si 3–5 10–20 | Ca 0.1 0.4 | Mg 0.1–0.2 0.4–0.8 | Zn 0.3–0.9 1–3 | Ni 2–7 8–20 | Cr 3–5 10–20 | Cu 1–5 4–14 | Fe 0.9–3 3–10 | Li 2 5–6 | Na 4–10 10–50 |
|---|---|---|---|---|---|---|---|---|---|---|---|---|---|---|---|
| 4 | 45 | A | | <0.8 | <1 | <10 | 3 | <0.4 | <0.6 | <5 | <3 | <4 | <2 | <2 | <7 |
|   |    | B | | <0.8 | <1 | <10 | 6 | 0.5 | <0.6 | <5 | <3 | <4 | <2 | <2 | <7 |
| 5 | 45 | A | | <0.8 | <1 | <10 | 16 | 1 | 3 | <5 | <3 | <4 | <2 | <2 | <23 |
|   |    | B | | <0.8 | <1 | <10 | 14 | 0.9 | 3 | <5 | <3 | <4 | <2 | <2 | <23 |
| 6 | 45 | A | | <0.8 | <1 | <10 | 22 | 1 | 5 | <5 | <3 | <4 | <2 | <2 | <23 |
|   |    | B | | <0.8 | <1 | <10 | 14 | 0.9 | 3 | <5 | <3 | <4 | <2 | <2 | <23 |
| 7 | 38 | A | | <0.8 | <1 | <10 | 3 | <0.4 | <0.6 | <5 | <3 | <4 | <2 | <2 | <7 |
|   |    | B | | <0.8 | <1 | <10 | 10 | 0.6 | <2 | <5 | <3 | <4 | <2 | <2 | <23 |
| 8 | 30 | A | | <0.8 | <1 | <20 | 31 | 1.6 | 3.4 | <5 | <3 | <4 | <2 | <2 | 25 |
|   |    | B | | <0.8 | <1 | <20 | 25 | 1.2 | 3 | <5 | <3 | <4 | <2 | <2 | 19 |
| 9 | 30 | A | | <3 | <2 | <20 | 28 | 0.7 | <0.9 | <5 | <4 | <2 | <3 | <2 | <10 |
|   |    | B | | <3 | <2 | <20 | 10 | 1.2 | <0.9 | <5 | <4 | <2 | <3 | <2 | <4 |

[1]The ICP was calibrated daily. Therefore, the detection limits varied from day to day.

TABLE 5b

Emission Analysis of Tosoh Mordenite (90 ppm Ti)
Blank Runs Using High Pressure $N_2$ (650 psi) at Low Flow (0.51 pm)

Analysis of Traps (ppb, nanogms/ml)

| No. | Total Gas Vol. (liters) | Trap | LLD LLQ | Ti 0.8–3 3–10 | Al 0.5–2 2–7 | Si 3–5 10–20 | Ca 0.1 0.4 | Mg 0.1–0.2 0.4–0.8 | Zn 0.3–0.9 1–3 | Ni 2–7 8–20 | Cr 3–5 10–20 | Cu 1–5 4–14 | Fe 0.9–3 3–10 | Li 2 5–6 | Na 4–10 10–50 |
|---|---|---|---|---|---|---|---|---|---|---|---|---|---|---|---|
| 10 | 60 | A | | <3 | <2 | <20 | 11 | <0.6 | <0.9 | <20 | <4 | <2 | <3 | <2 | <4 |
|    |    | B | | <3 | <2 | <20 | 7 | <0.6 | <0.9 | <5 | <4 | <2 | <3 | <2 | <4 |
| 11 | 60 | A | | <3 | <2 | <20 | 1.3 | <0.6 | <0.9 | <5 | <4 | <2 | <3 | <2 | <4 |
|    |    | B | | <3 | <2 | <20 | 5.8 | <0.6 | <0.9 | <5 | <4 | <2 | <3 | <2 | <4 |
| 12 | 60 | A | | <3 | <2 | <20 | 1.4 | <0.2 | <0.9 | <5 | <4 | <2 | <3 | <2 | <4 |
|    |    | B | | <3 | <2 | <20 | 1.5 | <0.2 | <0.9 | 5.1 | <4 | <2 | <3 | <2 | <4 |
| 13 | 45 | A | | <3 | <2 | <5 | 0.8 | <0.2 | <0.9 | <5 | <4 | <2 | <3 | <2 | <4 |
|    |    | B | | <3 | <2 | <5 | 5.9 | <0.2 | <0.9 | <5 | <4 | <2 | <3 | <2 | <4 |
| 14 | 60 | A | | <3 | <2 | <5 | 7 | <0.2 | <0.9 | <5 | <4 | <2 | <3 | <2 | <4 |
|    |    | B | | <3 | <2 | <5 | 11 | <0.2 | <0.9 | <5 | <4 | <2 | <3 | <2 | <10 |
| 15 | 60 | A | | <1 | <0.5 | <3 | 5.2 | <0.3 | <1 | <2 | <2 | <1 | <0.9 | <2 | <4 |
|    |    | B | | <1 | <0.5 | <3 | 10.6 | <0.3 | <1 | <2 | <2 | <1 | <0.9 | <2 | |

TABLE 5c

Emission Analysis of Tosoh Mordenite (90 ppm Ti)
Under High Pressure HCl (625 psi) at Low Flow (0.51 pm)

Analysis of Traps (ppb, nanogms/ml)

| Run No. | Total Gas Vol. (liters) | Trap LLD LLQ | Ti 0.8–3 3–10 | Al 0.5–2 2–7 | Si 3–5 10–20 | Ca 0.1 0.4 | Mg 0.1–0.2 0.4–0.8 | Zn 0.3–0.9 T–3 | Ni 2–7 8–20 | Cr 3–5 10–20 | Cu 1–5 4–14 | Fe 0.9–3 3–10 | Li 2 5–6 | Na 4–10 10–50 |
|---|---|---|---|---|---|---|---|---|---|---|---|---|---|---|
| 17 | 54 | A | 106 | 31 | 40 | 43 | 5 | <1 | <2 | 11 | <1 | 95 | <2 | <6 |
|    |    | B | <1 | 18 | 77 | 28 | 5 | <1 | <2 | <5 | <1 | 40 | <2 | <15 |
| 18 | 54 | A | 104 | 18 | 31 | 21 | 5 | <0.3 | <2 | <5 | <1 | 54 | <2 | <6 |
|    |    | B | <1 | 52 | 63 | 50 | 14 | <1 | <2 | <5 | <1 | 42 | <2 | <6 |
| 19 | 54 | A | 28 | 36 | <3 | 27 | 4 | <1 | <2 | <5 | <1 | 87 | <2 | <15 |
|    |    | B | <1 | 14 | 25 | 40 | 1 | <0.3 | <2 | <5 | <1 | 13 | <2 | <6 |
| 20 | 54 | A | 18 | 61 | 29 | 10 | 5 | <0.8 | <7 | <5 | <3 | 60 | <2 | <10 |
|    |    | B | <3 | 50 | 26 | 44 | 4 | 4 | <7 | <5 | <3 | 17 | <2 | <50 |
| 21 | 54 | A | 93 | 130 | <20 | 33 | 5 | 7 | <7 | <20 | <3 | 76 | <2 | <50 |
|    |    | B | <3 | 204 | 26 | 127 | 13 | 37 | <7 | <5 | <3 | 45 | <2 | 160 |
| 22 | 54 | A | 115 | 70 | <20 | 23 | 6 | <3 | <7 | <20 | <3 | 65 | <2 | <10 |
|    |    | B | <3 | 59 | 21 | 10 | 4 | <3 | <7 | <5 | <3 | 65 | <2 | |
| 23 | 54 | A | 44 | 124 | <20 | 109 | 12 | 17 | <20 | 22 | <3 | 250 | <2 | 72 |
|    |    | B | <3 | 92 | <20 | 57 | 6 | 20 | <7 | <5 | <3 | <9 | <2 | 80 |
|    |    | C[1] | | | 100 | | | | | | | | | |

TABLE 5c-continued

Emission Analysis of Tosoh Mordenite (90 ppm Ti)
Under High Pressure HCl (625 psi) at Low Flow (0.51 pm)

| | | | | | | | Analysis of Traps (ppb, nanogms/ml) | | | | | | | |
|---|---|---|---|---|---|---|---|---|---|---|---|---|---|---|
| Run No. | Total Gas Vol. (liters) | Trap LLD LLQ | Ti 0.8–3 3–10 | Al 0.5–2 2–7 | Si 3–5 10–20 | Ca 0.1 0.4 | Mg 0.1–0.2 0.4–0.8 | Zn 0.3–0.9 T–3 | Ni 2–7 8–20 | Cr 3–5 10–20 | Cu 1–5 4–14 | Fe 0.9–3 3–10 | Li 2 5–6 | Na 4–10 10–50 |
| 24 | 54 | A | 47 | 34 | <10 | 22 | 3 | <1 | <6 | 38 | <5 | 57 | <3 | <20 |
|  |  | B | <3 | 22 | <10 | 27 | 2 | <4 | <6 | <10 | <5 | 26 | <3 | <20 |
|  |  | C[1] | 50 | | | | | | | | | | | |
| 25 | 54 | A | 80 | 32 | <40 | 14 | 8 | 5 | <6 | 14 | <5 | 120 | <3 | <20 |
|  |  | B | <3 | <6 | <40 | 11 | 0.4 | <1 | <6 | <3 | <5 | <7 | <3 | <20 |
|  |  | C[1] | 39 | | | | | | | | | | | |

[1]Tetramethylammonium hydroxide in Trap C to capture silicon.

TABLE 5d

Emission Analysis of Tosoh Mordenite (90 ppm Ti)
Under High Pressure HCl (625 psi) at Low Flow (0.51 pm)

| Run No. | Total Gas Volume (liters) | HCl | Trap Wt. increase (gms) | Trap | Emissions in exiting HCl (ppb, w/w) combined emissions from both traps | | | | | |
|---|---|---|---|---|---|---|---|---|---|---|
| | | | | | Ti | Al | Si | Ca | Mg | Fe |
| 17 | 54 | 75.7 | 6.4 | A B | 276 | 107 | 236 | 111 | 17 | 299 |
| 18 | 54 | 62.0 | 2.1 | A B | 316 | 176 | 242 | 127 | 43 | 263 |
|  | 54 | 63.0 | 0.4 | A B | 86 | 144 | 59 | 123 | 9 | 298 |
| 20 | 54 | 60.3 | 0.1 | A B | 58 | 321 | 158 | 84 | 20 | 236 |
|  | 54 | 74.2 | 12.6 | A B | 209 | 645 | 45 | 254 | 30 | 249 |
| 22 | 54 | 68.0 | 15.5 | A B | 269 | 269 | 38 | 30 | 17 | 269 |
| 23 | 54 | 62.0 | 0.0 | A B C[1] | 138 | 613 | 185 | 425 | 47 | 786 |
| 24 | 54 | 57 | 0.4 | A B C[1] | 160 | 173 | 89 | 85 | 9 | 262 |
| 25 | 54 | 61.5 | 3.0 | A B C[1] | 242 | 97 | 62 | 14 | 20 | 363 |

[1]Tetramethylammonium hydroxide in Trap C to capture silicon.

TABLE 5e

Emission Analysis of Tosoh Mordenite (90 ppm Ti)
Under High Pressure HCl (625 psi) at High Flow (101 pm)

| | | | | | | | Analysis of Traps (ppb, nanogms/ml) | | | | | | | |
|---|---|---|---|---|---|---|---|---|---|---|---|---|---|---|
| Run No. | Total Gas Vol. (liters) | Trap LLD LLQ | Ti 0.8–3 3–10 | Al 0.5–2 2–7 | Si 3–5 10–20 | Ca 0.1 0.4 | Mg 0.1–0.2 0.4–0.8 | Zn 0.3–0.9 1–3 | Ni 2–7 8–20 | Cr 3–5 10–20 | Cu 1–5 4–14 | Fe 0.9–3 3–10 | Li 2 5–6 | Na 4–10 10–50 |
| 16 | 33[3] | A | 30 | 62 | 103 | 46 | 23 | 33 | <2 | <5 | <1 | 99 | <2 | 120 |
|  |  | B | <1 | <2 | 103 | 45 | 4 | 2 | <2 | <2 | <1 | <3 | <2 | <6 |
| 26 | 40 | A | 55 | 15 | <8 | 9 | 1 | <3 | <7 | <5 | <4 | 21 | <2 | <8 |
|  |  | B | <1 | <7 | <20 | 8 | 0.7 | <0.8 | <7 | <5 | <4 | <5 | <2 | <30 |
|  |  | C[1] | 108 | | | | | | | | | | | |
| 27 | 38 | A | 46 | 32 | <20 | 5 | 3 | <0.9 | <10 | <3 | <3 | 35 | <1 | <10 |
|  |  | B | <2 | <3 | <20 | 4 | <0.3 | <0.9 | <10 | <3 | <3 | <3 | <1 | <10 |

TABLE 5e-continued

Emission Analysis of Tosoh Mordenite (90 ppm Ti)
Under High Pressure HCl (625 psi) at High Flow (101 pm)

Analysis of Traps (ppb, nanogms/ml)

| Run No. | Total Gas Vol. (liters) | Trap LLD LLQ | Ti 0.8–3 3–10 | Al 0.5–2 2–7 | Si 3–5 10–20 | Ca 0.1 0.4 | Mg 0.1–0.2 0.4–0.8 | Zn 0.3–0.9 1–3 | Ni 2–7 8–20 | Cr 3–5 10–20 | Cu 1–5 4–14 | Fe 0.9–3 3–10 | Li 2 5–6 | Na 4–10 10–50 |
|---|---|---|---|---|---|---|---|---|---|---|---|---|---|---|
| 28 | 40 | A | 42 | 7 | <20 | 5 | <1 | <0.9 | <10 | <3 | <3 | <9 | <1 | <10 |
|  |  | B | <8 | <3 | <20 | 11 | 1 | <3 | <Io | <3 | <3 | <3 | <1 | <10 |
| 29 | 48 | A | 21 | 8 | <20 | 9 | 2 | 11 | <3 | <10 | <3 | 35 | <1 | <10 |
|  |  | B | <2 | 8 | <20 | 12 | <1 | <0.9 | <10 | <3 | <3 | <3 | <1 | <10 |
| 30 | 37 | A | 19 | <3 | <6 | 5 | <1 | <3 | <10 | <3 | <3 | <3 | <1 | <10 |
|  |  | B | <2 | <0.8 | <20 | 5 | <1 | <3 | <10 | <3 | <3 | <3 | <1 | <10 |
| 31 | 45 | A | 8 | 4 | <6 | 12 | 2 | <3 | <10 | <3 | <3 | <9 | <1 | <10 |
|  |  | B | <2 | <3 | <20 | 10 | 2 | <0.9 | <10 | <3 | <3 | <3 | <1 | <10 |
| 32 |  | A | 35 | 21 | <9 | 160 | 5 | 5 | <4 | <9 | <2 | 24 | <2 | <20 |
|  |  | B | <3 | 19 | <9 | 27 | 2 | <3 | <4 | <3 | <2 | 10 | <2 | <20 |
|  |  | C[1] |  |  |  |  |  |  |  |  |  |  |  |  |
| 33 |  | A | <9 | 3 | <9 | 22 | 2 | <0.8 | <4 | <3 | <2 | <10 | <2 | <7 |
|  |  | B | <3 | 19 | <9 | 15 | 2 | <0.8 | <4 | <3 | <2 | <4 | <2 | <20 |
|  |  | C[1] |  |  |  |  |  |  |  |  |  |  |  |  |
| 34 |  | A | 27 | 3 | <9 | 8 | 2 | <0.8 | <4 | <3 | <2 | <10 | <2 | <7 |
|  |  | B | <3 | <2 | <9 | 8 | 0.8 | 4 | <4 | <3 | <8 | <10 | <2 | <7 |
|  |  | C[1] |  |  |  |  |  |  |  |  |  |  |  |  |
| 35 |  | A | 1 | 164 |  | <0.1 | 4 | 13 | <4 | <3 | <2 | 17 | <2 | 44 |
|  |  | B | <1 | <0.8 |  | 13 | 2 | <0.4 | <4 | <3 | <2 | <3 | <2 | <4 |
| 36 |  | A[2] |  |  |  |  |  |  |  |  |  |  |  |  |
|  |  | B | <1 | 13 |  | 6 | 1 | <0.4 | <4 | <3 | <2 | <3 | <2 | <4 |
| 37 |  | A | <1 | 6 |  | 10 | 1 | <0.4 | <4 | <3 | <2 | <3 | <2 | <4 |
|  |  | B | <1 | 6 |  | 5 | 1 | <0.4 | <4 | <3 | <2 | <3 | <2 | <4 |

[1]Tetrabutylammonium hydroxide in Trap C to capture silicon.
[2]Sample lost.
[3]Cylinder ran out.

TABLE 5f

Emission Analysis of Tosoh Mordenite (90 ppm Ti)
Under High Pressure HCl (625 psi) at High Flow (101 pm)

| Run No. | Total Gas Volume (liters) | Trap Wt. Increase (gms HCl) | Trap | Ti | Al | Si | Ca | Mg | Fe |
|---|---|---|---|---|---|---|---|---|---|
| 16 | 33 | 51.0 | A | 96 | 198 | 632 | 218 | 79 | 317 |
|  |  | 0.1 | B |  |  |  |  |  |  |
| 26 | 40 | 63.0 | A | 170 | 46 |  |  |  | 65 |
|  |  | 0.0 | B |  |  |  |  |  |  |
|  |  |  | C[1] |  |  |  |  |  |  |
| 27 | 38 | 56.4 | A | 151 | 105 |  |  |  | 115 |
|  |  | 3.2 | B |  |  |  |  |  |  |
| 28 | 40 | 56 | A | 130 | 22 |  |  |  |  |
|  |  | 7 | B |  |  |  |  |  |  |
| 29 | 48 | 66.8 | A | 55 | 37 |  |  |  | 92 |
|  |  | 7.5 | B |  |  |  |  |  |  |
| 30 | 37 | 54 | A | 65 |  |  |  |  |  |
|  |  | 3 |  |  |  |  |  |  |  |
| 31 | 45 | 59 | A | 22 | 11 |  |  |  |  |
|  |  | 11.5 | B |  |  |  |  |  |  |
| 32 |  | 65 | A | 93 |  |  |  |  |  |
|  |  | 8 | B |  |  |  |  |  |  |
|  |  |  | C[1] |  |  |  |  |  |  |
| 33 |  | 55 | A | <29 |  |  |  |  |  |
|  |  | 5 | B |  |  |  |  |  |  |
|  |  |  | C[1] |  |  |  |  |  |  |
| 34 |  | 56 | A | 86 |  |  |  |  |  |
|  |  | 5 | B |  |  |  |  |  |  |
|  |  |  | C[1] |  |  |  |  |  |  |
| 35 |  | 53 | A |  |  |  |  |  |  |
|  |  | 7 | B |  |  |  |  |  |  |
| 36 |  | 59 | A2 |  |  |  |  |  |  |
|  |  | 8 | B |  |  |  |  |  |  |
| 37 |  | 66 | A |  |  |  |  |  |  |
|  |  | 1 | B |  |  |  |  |  |  |

[1]Tetrabutylammonium hydroxide in Trap C to capture silicon.
[2]Sample lost.

TABLE 6a

Emission Analysis of Tosoh Mordenite (90 ppm Ti) (confirmation run)
Blank Runs Using High Pressure $N_2$ (650 psi) at High Flow (101 pm)

Analysis of Traps (ppb, nanogms/ml)

| Run No. | Trap | LLD LLQ | Ti 0.9–2 3–8 | Al 0.6–3 2–9 | Si 2–7 5–20 | Ca 0.1–0.3 0.2–1 | Mg 0.1–0.2 0.4–0.8 | Zn 0.4–1 1–4 | Ni 2–10 6–30 | Cr 0.7–7 2–20 | Cu 0.8–5 2–20 | Fe 0.9–3 3–10 | Li 0.4–3 2–9 | Na 4–10 10–40 |
|---|---|---|---|---|---|---|---|---|---|---|---|---|---|---|
| 1 | A | | <0.9 | <2 | <5 | 2.6 | <0.2 | <0.4 | <2 | <0.7 | <0.8 | <1 | <0.4 | <4 |
|   | B | | <0.9 | <0.6 | <2 | 0.9 | <0.2 | <0.4 | <2 | <0.7 | <0.8 | <1 | <0.4 | <4 |
| 2 | A | | <0.9 | <0.6 | 6 | 2.2 | 0.2 | <0.4 | <2 | <0.7 | <0.8 | <1 | <0.4 | <4 |
|   | B | | <0.9 | <0.6 | <2 | 0.5 | <0.1 | <0.4 | <2 | <0.7 | <0.8 | <1 | <0.4 | <4 |
| 3 | A | | <0.9 | <0.6 | <2 | 1.5 | <0.1 | <0.4 | <2 | <0.7 | <0.8 | <1 | <0.4 | <4 |
|   | B | | <0.9 | <0.6 | <2 | 0.3 | <0.1 | <0.4 | <2 | <0.7 | <0.8 | <1 | <0.4 | <4 |

TABLE 6b

Emission Analysis of Tosoh Mordenite (90 ppm Ti) (confirmation run)
Under High Pressure HC1 (625 psi) at High Flow (101 pm)

Analysis of DI Water Traps (ppb, nanogms/ml)

| Run No. | Trap | LLD LLQ | Ti 0.9–2 3–8 | Al 0.6–3 2–9 | Si 2–7 5–20 | Ca 0.1–0.3 0.2–1 | Mg 0.1–0.2 0.4–0.8 | Zn 0.4–1 1–4 | Ni 2–10 6–30 | Cr 0.7–7 2–20 | Cu 0.8–5 2–20 | Fe 0.9–3 3–10 | Li 0.4–3 2–9 | Na 4–10 10–40 |
|---|---|---|---|---|---|---|---|---|---|---|---|---|---|---|
| 1 | A | | 68 | <8 | <20 | 16 | <0.2 | <0.6 | <10 | <0.7 | <2 | 33 | <3 | <10 |
|   | B | | <2 | <8 | <20 | 12 | 2 | <0.6 | <10 | <0.7 | <2 | <20 | <3 | <40 |
|   | C | | | | 186 | | | | | | | | | |
| 2 | A | | 26 | <8 | <20 | 6 | 1 | <0.6 | <10 | <2 | <2 | <20 | <3 | <10 |
|   | B | | | <8 | <20 | 8 | 1 | <0.6 | <10 | <2 | <2 | <20 | <3 | <10 |
|   | C | | | | 430 | | | | | | | | | |
| 3 | A | | 56 | <8 | <7 | 19 | 2 | <0.6 | <10 | <2 | <2 | <20 | <3 | <40 |
|   | B | | | <8 | 27 | 13 | 3 | <0.6 | <10 | <2 | <2 | <5 | <3 | <40 |
|   | C | | | | 81 | | | | | | | | | |
| 4 | A | | 67 | 9 | <7 | 16 | 2 | <0.6 | <10 | <2 | <2 | <20 | <3 | <40 |
|   | B | | | <8 | <7 | 12 | I | <0.6 | <10 | <2 | <2 | <5 | <3 | <40 |
|   | C | | | | | | | | | | | | | |
| 5 | A | | 56 | 9 | <20 | 18 | 4 | <0.6 | <10 | <2 | <2 | 26 | <3 | <40 |
|   | B | | | <8 | <7 | 8 | <0.7 | <0.6 | <10 | <2 | <2 | <5 | <3 | <10 |
|   | C | | | | 87 | | | | | | | | | |
| 6 | A | | 46 | <8 | <7 | 4 | 1 | <0.6 | <10 | <2 | <2 | <20 | <3 | <10 |
|   | B | | | <2 | <7 | 10 | 1 | <0.6 | <10 | <2 | <2 | <5 | <3 | <10 |
|   | C | | | | 38 | | | | | | | | | |
| 7 | A | | 41 | 11 | <7 | 9 | 3 | <1 | <8 | <5 | <5 | <10 | <2 | <10 |
|   | B | | | <2 | <7 | 5 | <0.3 | <1 | <8 | <5 | <5 | <4 | <2 | |
|   | C | | | | | | | | | | | | | |
| 8 | A | | 39 | 28 | <7 | 8 | <1 | <1 | <8 | <5 | <5 | 10 | <2 | <10 |
|   | B | | | <2 | <7 | 3 | <0.3 | <1 | <8 | <5 | <5 | <4 | <2 | <10 |
|   | C | | | | <10 | | | | | | | | | |
| 9 | A | | 37 | <2 | <7 | 4 | 1 | <1 | <8 | <5 | <5 | <4 | <2 | <10 |
|   | B | | | <2 | <7 | 4 | <1 | <1 | <8 | <5 | <5 | <4 | <2 | <10 |
|   | C | | | | 29 | | | | | | | | | |
| 10 | A | | 47 | <9 | <10 | 12 | 2 | <2 | <5 | <4 | <4 | <10 | <2 | <30 |
|    | B | | | <9 | <4 | 2 | 0.4 | <2 | <5 | <4 | <4 | <4 | <2 | <10 |
|    | C | | | | <4 | | | | | | | <4 | | |
| 11 | A | | 54 | <8 | 17 | 6 | 2 | <2 | <5 | <4 | <4 | <10 | <2 | <10 |
|    | B | | | <3 | <4 | 10 | 0.7 | <2 | <5 | <4 | <4 | <4 | <2 | <10 |
|    | C | | | | | | | | | | | | | |
| 12 | A | | 83 | <3 | <4 | 9 | 1 | <2 | <5 | <4 | <4 | <10 | <2 | <30 |
|    | B | | | <3 | <4 | 15 | 1 | 2 | <5 | <4 | <4 | <4 | <2 | <30 |
|    | C | | | | <10 | | | | | | | | | |
| 13 | A | | 26 | <3 | <4 | 12 | 2 | <2 | <5 | <4 | <4 | <10 | <2 | <10 |
|    | B | | | <3 | <4 | 10 | 0.6 | <2 | <5 | <4 | <4 | <4 | <2 | <10 |
| 14 | A | | 13 | <3 | <4 | 19 | 2 | <0.5 | <5 | <4 | <4 | <10 | <2 | <10 |
|    | B | | | <3 | <4 | 10 | 0.7 | <0.5 | <5 | <4 | <4 | <4 | <2 | <10 |
| 15 | A | | 31 | <3 | | 1 | 5 | | <8 | <6 | <4 | 34 | <2 | <10 |
|    | B | | 16 | <3 | | 2 | 1 | | <8 | <6 | <4 | <4 | <2 | <40 |
| 16 | A | | 16 | <3 | | 1 | 0.9 | | <8 | <6 | <4 | <4 | <2 | <10 |
|    | B | | | <3 | | 1 | 0.4 | | <8 | <6 | <4 | <4 | <2 | 41 |
| 17 | A | | 4 | <4 | | 17 | 2 | <2 | <4 | <4 | <5 | <10 | <2 | <10 |
|    | B | | | <1 | | 12 | <0.7 | <0.7 | <4 | <4 | <5 | <4 | <2 | <10 |
| 18 | A | | 10 | <4 | | 4 | 1 | 2 | <4 | <4 | <5 | <4 | <2 | <10 |
|    | B | | | <4 | | 6 | <0.7 | 3 | <4 | <4 | <5 | <4 | <2 | <10 |

TABLE 6b-continued

Emission Analysis of Tosoh Mordenite (90 ppm Ti) (confirmation run)
Under High Pressure HCl (625 psi) at High Flow (101 pm)

Analysis of DI Water Traps (ppb, nanogms/ml)

| Run No. | Trap | LLD LLQ | Ti 0.9–2 3–8 | Al 0.6–3 2–9 | Si 2–7 5–20 | Ca 0.1–0.3 0.2–1 | Mg 0.1–0.2 0.4–0.8 | Zn 0.4–I 1–4 | Ni 2–10 6–30 | Cr 0.7–7 2–20 | Cu 0.8–5 2–20 | Fe 0.9–3 3–10 | Li 0.4–3 2–9 | Na 4–10 10–40 |
|---|---|---|---|---|---|---|---|---|---|---|---|---|---|---|
| 19 | A |  | 12 | 7 |  | 20 | 4 | <0.7 | <4 | <4 | <5 | 16 | <2 | <10 |
|    | B |  |    | <1 |  | 16 | 1 | 3 | <4 | <4 | <5 | <4 | <2 | <10 |
| 20 | A |  | 4.6 |   |  |    |   |   |    |    |    |    |    |    |
|    | B |  |    |    |  |    |   |   |    |    |    |    |    |    |
| 21 | A |  | 10 |    |  |    |   |   |    |    |    |    |    |    |
|    | B |  |    |    |  |    |   |   |    |    |    |    |    |    |

TABLE 6c

Emission Analysis of Tosoh Mordenite (90 ppm Ti) (confirmation run)
Under High Pressure HCl (625 psi) at High Flow (101 pm)

| Run No. | Total Time on Stream W/HCl (hrs) | Total Time of Exposure to HCl (hrs) | Trap Wt. Increase (gms HCl) | Trap | Ti | Al | Si | Ca | Mg | Fe |
|---|---|---|---|---|---|---|---|---|---|---|
| 1 | 2.0 | 4.0 | 64.3 | A | 172 |  | 362 | 50 |  | 83 |
|   |     |     | 12.9 | B |     |    |     |    |   |    |
|   |     |     |      | C |     |    |     |    |   |    |
| 2 | 4.5 | 6.5 | 61.9 | A | 77 |  | 982 |   |   |    |
|   |     |     | 3.8  | B |    |  |     |   |   |    |
|   |     |     |      | C |    |  |     |   |   |    |
| 3 | 7.0 | 9.0 | 63.5 | A | 160 |  | 238 |   |   |    |
|   |     |     | 4.6  | B |     |  |     |   |   |    |
|   |     |     |      | C |     |  |     |   |   |    |
| 4 | 9.5 | 11.5 | 61 | A | 179 | 20 |   |   |   |    |
|   |     |      |    | B |     |    |   |   |   |    |
|   |     |      |    | C |     |    |   |   |   |    |
| 5 | 11.8 | 13.8 | 57 | A | 182 | 52 | 218 |   |   | 85 |
|   |      |      | 3  | B |     |    |     |   |   |    |
|   |      |      |    | C |     |    |     |   |   |    |
| 6 | 14.2 | 16.2 | 57 | A | 145 |   | 92 |   |   |    |
|   |      |      | 5  | B |     |   |    |   |   |    |
|   |      |      |    | C |     |   |    |   |   |    |
| 7 | 16.5 | 18.5 | 59 | A | 127 | 29 |   |   |   |    |
|   |      |      | 4  | B |     |    |   |   |   |    |
|   |      |      |    | C |     |    |   |   |   |    |
| 8 | 18.5 | 25.2 | 62.2 | A | 121 | 73 |   |   |   | 31 |
|   |      |      | 0.8  | B |     |    |   |   |   |    |
|   |      |      |      | C |     |    |   |   |   |    |
| 9 | 21.0 | 27.7 | 61 | A | 99 |  | 99 |   |   |    |
|   |      |      | 12 | B |    |  |    |   |   |    |
|   |      |      |    | C |    |  |    |   |   |    |
| 10 | 23.3 | 30.0 | 57 | A | 150 |   |   |   |   |    |
|    |      |      | 4  | B |     |   |   |   |   |    |
|    |      |      |    | C |     |   |   |   |   |    |
| 11 | 25.8 | 32.5 | 55 | A | 178 |   | 56 |   |   |    |
|    |      |      | 4  | B |     |   |    |   |   |    |
|    |      |      |    | C |     |   |    |   |   |    |
| 12 | 27.8 | 51.6 | 53 | A | 284 |   |   |   |   |    |
|    |      |      | 4  | B |     |   |   |   |   |    |
|    |      |      |    | C |     |   |   |   |   |    |
| 13 | 30.5 | 54.3 | 52 | A | 92 |   |   |   |   |    |
|    |      |      | 3  | B |    |   |   |   |   |    |
| 14 | 33.0 | 56.8 | 52 | A | 45 |   |   |   |   |    |
|    |      |      | 4  |   |    |   |   |   |   |    |
| 15 | 35.0 | 102.6 | 57 | A | 101 |   |   |   |   | 111 |
|    |      |       | 3  | B |     |   |   |   |   |     |
| 16 | 37.5 | 105.1 | 53 | A | 54 |   |   |   |   |    |
|    |      |       | 5  | B |    |   |   |   |   |    |
| 17 | 39.5 | 124   | 57 | A | <13 |   |   |   |   |    |
|    |      |       | 4  | B |     |   |   |   |   |    |
| 18 | 42.9 | 126.4 | 55 | A | <31 |   |   |   |   |    |
|    |      |       | 8  | B |     |   |   |   |   |    |
| 19 | 45.4 | 128.9 | 52 | A | 43 |   |   |   |   | 58 |
|    |      |       | 2  | B |    |   |   |   |   |    |

TABLE 6c-continued

Emission Analysis of Tosoh Mordenite (90 ppm Ti) (confirmation run)
Under High Pressure HCl (625 psi) at High Flow (101 pm)

| Run No. | Total Time on Stream W/HCl (hrs) | Total Time of Exposure to HCl (hrs) | Trap Wt. Increase (gms HCl) | Trap | Emissions in exiting HCl (ppb, w/w) combined emissions from both traps | | | | | |
|---|---|---|---|---|---|---|---|---|---|---|
| | | | | | Ti | Al | Si | Ca | Mg | Fe |
| 20 | 47.4 | 150.4 | 63 | A | 13 | | | | | |
| | | | 4 | B | | | | | | |
| 21 | 49.9 | 152.9 | 58 | A | 33 | | | | | |
| | | | 1 | B | | | | | | |

Example 7

Removal of Titanium from HCl Stream by Low Metal Mordenite Zeolite Purifier

In this example, removal of metal challenges from hydrogen chloride was studied. Purified hydrogen chloride gas was passed through a bubbler containing titanium tetrachloride ($TiCl_4$) at 0° C. at a flow rate of 0.1 standard liter per minute. This hydrogen chloride stream containing the volatile $TiCl_4$ was then mixed with another hydrogen chloride stream thus obtaining a combined flow rate of 0.9 standard liter per minute. The gas lines downstream of the bubbler were maintained at 70° C. by means of heating tapes to ensure that the volatilized titanium chloride species did not re-condense on the manifold walls. The gas mixture was directed to one of three ports: (1) a zeolite purifier consisting of 60 milliliter low titanium mordenite from Tosoh (containing about 15 ppm Ti), heated to about 630° C., and having a 0.003 micrometer particle filter installed downstream; (2) an empty control purifier with a 0.003 micrometer particle filter downstream; and (3) a bypass line. The outlet gas of each port was sampled after about an hour on stream, by hydrolysis. The sampling procedure consisted of bubbling the outlet gas through 50 grams of deionized water, in a Teflon vessel, until the water became saturated and gas bubbles broke through the surface. The hydrolysis samples were then analyzed for their metal content using the method of ICP-MS (Inductively Coupled Plasma—Mass Spectrometry) and the resulting concentrations were multiplied by the proper dilution factors to allow the calculation of the concentration of the metals in the gas stream.

Results for this experiment are summarized in Table 7. First, the titanium concentration in the hydrogen chloride gas passing through the zeolite purifier was compared to that in the bypass line. Hydrogen chloride gas containing a challenge of about 455 ppm (455311.96 ppb) of titanium, measured from the bypass line, was passed through the zeolite purifier. The titanium concentration in the hydrogen chloride gas exiting the zeolite purifier was measured as only about 13 ppb, showing a titanium decrease by a factor of 35,000.

Second, the titanium concentration in the hydrogen chloride gas passing through the control purifier was compared to that passing through the zeolite purifier. The hydrogen chloride gas stream passing through the control purifier had a titanium concentration of about 175 ppm, whereas the titanium concentration in the hydrogen chloride gas exiting the zeolite purifier was measured as only about 16 ppb.

Finally, the titanium concentration in the hydrogen chloride gas passing through the control purifier was compared to that in the bypass line. The hydrogen chloride gas stream passing through the control purifier had a titanium concentration of about 62 ppm, while the titanium concentration in the bypass line was measured at about 576 ppm.

The differences of orders of magnitude in titanium concentration after passing through the zeolite purifier are a significant result of this experiment, notwithstanding the inconsistencies in the numbers obtained, which are expected in view of inaccuracies inherent to this work. The zeolite bed is clearly very effective in purifying the hydrogen chloride gas stream by almost completely removing the titanium challenge. In many applications such as in various semiconductor manufacturing processes, metal concentrations in the hundreds of ppm in corrosive gases are highly unlikely under any reasonable circumstances. In such applications, the purifier may in fact remove the titanium to below the detection limit, when present in an initial concentration of about 10 ppm in the gas.

TABLE 7

Removal of Titanium Challenge in HCl gas by Tosoh Mordenite (containing about 15 ppm Ti)

| Sample Location | Ti Concentration in HCl Fas (ppb) | Detection Limit (ppb) |
|---|---|---|
| From Bypass Line | 455311.96 | 0.27 |
| After Zeolite Purifier | 12.97 | 0.24 |
| After Control Purifier | 175713.77 | 0.26 |
| After Zeolite Purifier | 16.46 | 0.23 |
| After Control Purifier | 61766.26 | 0.24 |
| From Bypass Line | 575572.36 | 0.23 |

The present invention is not to be limited in scope by the specific embodiments and examples described herein. Indeed, various modifications of the invention in addition to those described herein will become apparent to those skilled in the art from the foregoing description and accompanying figures. Such modifications are intended to fall within the scope of the appended claims.

Various publications are cited herein, the disclosures of which are hereby incorporated by reference in their entireties.

What is claimed is:

1. A method for preparing a zeolite having a low concentration of at least one metallic impurity, wherein the zeolite has a silica-to-alumina ratio of above about 10, the method comprising:

(a) heating the zeolite to a temperature of at least about 400° C. for a period of time sufficient to desorb an amount of water that is physically adsorbed on the zeolite followed by cooling to ambient temperature; and (b) contacting the zeolite with an acid gas for a period of time sufficient to reduce the metallic impurity concentration in the zeolite to less than about 70 ppm.

2. The method of claim 1 wherein the metallic impurity is selected from the group consisting of titanium, iron, magnesium, calcium, zinc and aluminum.

3. The method of claim 2 wherein the metallic impurity is titanium.

4. The method of claim 1 wherein the zeolite is heated to a temperature of about 150° C. while being contacted with the acid gas.

5. The method of claim 1 wherein the zeolite is heated to a temperature of about 250° C. while being contacted with the acid gas.

6. The method of claim 1 wherein the acid gas is selected from the group consisting of hydrogen chloride and hydrogen bromide.

7. The method of claim 6 wherein the acid gas is hydrogen chloride and is at a pressure of above about 600 psi.

8. The method of claim 6 wherein the acid gas is hydrogen bromide and is at a pressure of above about 300 psi.

9. The method of claim 1 further comprising cooling the zeolite to a temperature less than about 300° C. prior to contacting the zeolite with the acid gas.

10. The method of claim 9 wherein the zeolite is cooled to ambient temperature prior to contacting the zeolite with the acid gas.

11. The method of claim 1 further comprising heating the zeolite to a temperature of at least about 650° C., prior to contacting the zeolite with the acid gas, for a period of time sufficient to remove a second amount of water from the zeolite by dehydroxylation of the zeolite.

12. The method of claim 1 wherein the silica-to-alumina ratio of the zeolite is in the range of about 10 to about 30.

13. The method of claim 1 wherein the zeolite has a uniform particle size of about 1 mm to about 1.5 mm.

14. The method of claim 1 wherein the zeolite is a mordenite.

15. The method of claim 1 wherein the zeolite is in the acidic form.

16. The method of claim 1 wherein the zeolite comprises less than about 1% by weight sodium as sodium oxide ($Na_2O$).

17. The method of claim 1 wherein the metallic impurity is titanium and the zeolite has a titanium concentration of less than about 20 ppm.

18. The method of claim 1 wherein the metallic impurity is magnesium and the zeolite has a magnesium concentration of less than about 11 ppm.

19. The method of claim 1 wherein the zeolite is selected from the group consisting of ZSM-5 (MFI), ZSM-11 (MEL), beta (BEA), faujasite USY (FAU), hexagonal faujasite (EMT), ferrierite (FER) and chabazite (CHA).

20. The zeolite prepared by the method of claim 1.

21. The zeolite of claim 20 wherein the metallic impurity is selected from the group consisting of titanium, iron, magnesium, calcium, zinc and aluminum.

22. The zeolite of claim 21 wherein the metallic impurity is titanium.

23. The zeolite of claim 20 wherein the zeolite is heated to a temperature of about 150° C. while being contacted with the acid gas.

24. The zeolite of claim 20 wherein the zeolite is heated to a temperature of about 250° C. while being contacted with the acid gas.

25. The zeolite of claim 20 wherein the acid gas is selected from the group consisting of hydrogen chloride and hydrogen bromide.

26. The zeolite of claim 25 wherein the acid gas is hydrogen chloride and is at a pressure of above about 600 psi.

27. The zeolite of claim 25 wherein the acid gas is hydrogen bromide and is at a pressure of above about 300 psi.

28. The zeolite of claim 20 wherein the silica-to-alumina ratio of the zeolite is in the range of about 10 to about 30.

29. The zeolite of claim 20 wherein the zeolite has a uniform particle size of about 1 mm to about 1.5 mm.

30. The zeolite of claim 20 wherein the zeolite is a mordenite.

31. The zeolite of claim 20 wherein the zeolite is in the acidic form.

32. The zeolite of claim 20 wherein the zeolite comprises less than about 1% by weight sodium as sodium oxide ($Na_2O$).

33. The zeolite of claim 20 wherein the metallic impurity is titanium and the zeolite has a titanium concentration of less than about 20 ppm.

34. The zeolite of claim 20 wherein the metallic impurity is magnesium and the zeolite has a magnesium concentration of less than about 11 ppm.

35. The zeolite of claim 20 wherein the zeolite is selected from the group consisting of ZSM-5 (MFI), ZSM-11 (MEL), beta (BEA), faujasite USY (FAU), hexagonal faujasite (EMT), ferrierite (FER) and chabazite (CHA).

36. A method for removing at least one metallic impurity from a gas, comprising:

(a) heating a zeolite to a temperature of at least about 400° C.; and (b) contacting said gas with the zeolite;

wherein the zeolite has a silica-to-alumina ratio of above about 10 and a low concentration of at least one metallic impurity.

37. The method of claim 36 wherein the zeolite has a concentration of at least one metallic impurity of less than about 70 ppm.

38. The method of claim 36 further comprising cooling the zeolite to a temperature less than about 300° C. prior to contacting the gas with the zeolite.

39. The method of claim 38 wherein the zeolite is cooled to ambient temperature prior to contacting the gas with the zeolite.

40. The method of claim 36 wherein in step (a) the zeolite is heated to a temperature of at least about 400° C. for a time sufficient to desorb an amount of water that is physically adsorbed on the zeolite.

41. The method of claim 36 further comprising heating the zeolite to a temperature of at least about 650° C. prior to contacting said gas with the zeolite.

42. The method of claim 41 wherein the zeolite is heated to a temperature of at least about 650° C. for a time sufficient to remove a second amount of water from the zeolite by dehydroxylation of the zeolite.

43. The method of claim 36 wherein the metallic impurity is selected from the group consisting of titanium, iron, magnesium, calcium, zinc and aluminum.

44. The method of claim 43 wherein the metallic impurity is titanium and the zeolite has a titanium concentration of less than about 20 ppm.

45. The method of claim 43 wherein the metallic impurity is magnesium and the zeolite has a magnesium concentration of less than about 11 ppm.

46. The method of claim 36 wherein the silica-to-alumina ratio of the zeolite is in the range of about 10 to about 30.

47. The method of claim 36 wherein the zeolite has a uniform particle size of about 1 mm to about 1.5 mm.

48. The method of claim 36 wherein the zeolite is a mordenite.

49. The method of claim 36 wherein the zeolite is in the acidic form.

50. The method of claim 36 wherein the zeolite comprises less than about 1% by weight sodium as sodium oxide ($Na_2O$).

51. The method of claim 36 wherein the gas is an acid gas.

52. The method of claim 51 wherein the gas is selected from the group consisting of hydrogen chloride and hydrogen bromide.

53. The method of claim 36 wherein the zeolite is selected from the group consisting of ZSM-5 (MFI), ZSM-11 (MEL), beta (BEA), faujasite USY (FAU), hexagonal faujasite (EMT), ferrierite (FER) and chabazite (CHA).

\* \* \* \* \*